(12) United States Patent
Beer et al.

(10) Patent No.: US 7,353,726 B2
(45) Date of Patent: Apr. 8, 2008

(54) SHIFTING DEVICE FOR A TRANSMISSION

(75) Inventors: Uwe Beer, Fahrland (DE); Michael Drabek, Schenkenberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 251 days.

(21) Appl. No.: 10/534,820

(22) PCT Filed: Nov. 11, 2003

(86) PCT No.: PCT/EP03/12585

§ 371 (c)(1),
(2), (4) Date: Dec. 15, 2005

(87) PCT Pub. No.: WO2004/046588

PCT Pub. Date: Jun. 3, 2004

(65) Prior Publication Data

US 2006/0150761 A1    Jul. 13, 2006

(30) Foreign Application Priority Data

Nov. 16, 2002  (DE) ................................ 102 53 471

(51) Int. Cl.
  *F16H 3/38* (2006.01)
(52) U.S. Cl. ............................ 74/340; 74/330; 74/331; 74/333; 74/337.5; 74/339; 74/473.32; 74/473.33; 74/473.36; 74/473.37
(58) Field of Classification Search .................. 74/340, 74/473.12, 473.25, 473.32, 473.33, 473.36, 74/473.37
See application file for complete search history.

(56) References Cited

U.S. PATENT DOCUMENTS

| 4,170,148 | A | * | 10/1979 | Wolfe ........................ 74/337.5 |
| 4,335,623 | A |   | 6/1982  | Kronstadt |
| 4,377,951 | A |   | 3/1983  | Magg et al. |
| 4,391,158 | A | * | 7/1983  | Malott et al. ............ 74/473.33 |
| 5,503,039 | A |   | 4/1996  | Bailly et al. |
| 6,318,211 | B1 |  | 11/2001 | Nitzschke et al. |
| 6,427,548 | B1 | * | 8/2002 | Leimbach et al. ............ 74/331 |
| 6,634,247 | B2 | * | 10/2003 | Pels et al. ..................... 74/329 |

(Continued)

FOREIGN PATENT DOCUMENTS

DE        30 00 577 A1    7/1981

(Continued)

*Primary Examiner*—David D. Le
(74) *Attorney, Agent, or Firm*—Davis Bujold & Daniels, P.L.L.C.

(57) ABSTRACT

A shifting device for a transmission, in which at least one gearshift package is allocated to two non-successive gears and each of these gearshift packages is coupled with a gearshift lever. An H- or a multiple H-shifting diagram is allocated to the gearshift lever, in which the gears that can be selected within a gearshift path are allocated to different gearshift packages. The gearshift lever and the gearshift packages are connected to a conversion device with which a gearshift lever movement to take out a previous gear in a gearshift path causes this gear to be taken out in a first gearshift package. A gearshift lever movement for putting in the new gear in the same gearshift path, a second gearshift package puts in this new gear. The conversion device functions in such a way that the gearshift lever is coupled with an axially displaceable and radially pivotable shift finger shaft.

37 Claims, 14 Drawing Sheets

U.S. PATENT DOCUMENTS

| | | | |
|---|---|---|---|
| 7,093,511 B2 * | 8/2006 | Norum et al. ................ 74/335 |
| 2004/0112158 A1 | 6/2004 | Norum et al. | |

FOREIGN PATENT DOCUMENTS

| DE | 35 27 390 A1 | 2/1987 |
| DE | 42 23 409 A1 | 11/1992 |
| DE | 41 37 143 A1 | 5/1993 |
| DE | 195 14 246 C2 | 6/1997 |
| DE | 101 08 881 A1 | 9/2002 |
| DE | 102 06 561 A1 | 10/2002 |
| DE | 102 31 547 A1 | 1/2004 |
| EP | 0 149 020 A2 | 7/1985 |
| EP | 1 034 384 B1 | 2/2002 |
| EP | 1 308 651 A1 | 5/2003 |
| FR | 2 815 103 | 4/2002 |
| WO | WO-99/28654 | 6/1999 |

* cited by examiner

SHIFTING DEVICE FOR A TRANSMISSION

This application is a national stage completion of PCT/EP2003/012585 filed Nov. 11, 2003, which claims priority from German Application Serial No. 102 53 471.3 filed Nov. 16, 2002.

FIELD OF THE INVENTION

The invention relates to a shifting device.

BACKGROUND OF THE INVENTION

Due to DE 41 37 143 A1, we are familiar with a multi-step synchronized countershaft, in which two gears each are assigned to one of several gearshift packages. These gearshift packages generally consist of sliding collars which can be moved axially, but are torsion-resistantly arranged on a gearbox shaft which, in joint action with synchronic rings that are located close to these sliding collars on the shaft, brake and accelerate loose gear wheels, and can connect rotation-resistantly with this gearbox shaft.

In this transmission, the two gears ($1^{st}$ gear and $3^{rd}$ gear or $2^{nd}$ and $4^{th}$ gear), which are allocated to a gearshift package, do not follow each other. This gear design has the advantage that it creates a gearshift system, which allows for an overlapping shift actuation and thus reduces the amount of time it takes to shift gears. A disadvantage is, however, that such a gear with a shifting device with H-gear shifting gate is difficult to shift, because normally only successive gears are shifted in the same gearshift path with an H-gear shifting gate.

Furthermore, due to EP 10 34 384 B1, one is familiar with a twelve gear gearbox for utility vehicles. In this gearbox, a pre-shifting module is shifted manually, whereas the main or top shifting modules are shifted automatically. Pneumatic shifting devices are designed for the main shifting module and the top shifting module and are activated when the gearshift path of the desired gear is selected through the respective manual shifting device. Thus, the shifting diagram corresponds with the shifting diagram of a regular six gear gearbox. The disadvantage of this gear design is, however, that separate pneumatic shifting devices have to be provided for in order to be able to shift the gears the way it is usually done in an H-shifting diagram.

Furthermore, we are familiar with a shifting device for motor vehicles from DE 30 00 577, in which a manual shift lever is shifted in an HH-shifting diagram. In this shifting device, two shift fingers are arranged on the selector shaft in such a way that only one shift finger each shifts the four gears of the basic transmission. When changing from the second into the third gearshift path, a pilot valve is actuated, which shifts the range. When shifting into the third and fourth path, the second shift finger is engaged. A disadvantage here is also the separate actuator mechanism of the transmission range.

DE 35 27 390 A1 also shows a manually shiftable, double clutch transmission in which one of the two clutches of the double clutch is engaged when the gearshift lever is actuated in one gearshift path. The disadvantage of this shifting device is that it is limited to only four forward gears when shifting purely manually without any additional power source.

Finally, a shifting device for a transmission is described in the unpublished DE 102 31 547 A1 in which at least one gearshift package is allocated to two non-successive gear transmission ratio steps of the transmission. This shifting device is equipped with a mechanical conversion device which enables the one manual contactor with an H-gearshift frame to shift such a transmission.

In this shifting device, the gearshift lever is guided in an H- or multiple-H-gearshift frame and coupled with gearshift shafts so that a movement of the gearshift lever in a gearshift path causes the gearshift shaft to swivel around its longitudinal axis. Furthermore, a gear wheel is mounted on the first gearshift shaft, which combines with a second gear wheel on a second gearshift shaft. When the first gearshift shaft rotates, the second gearshift shaft counter-rotates in the other direction. When selecting a gearshift path with the gearshift lever, the two gearshift shafts are forced to couple parallel to their longitudinal axis.

Furthermore, these two gearshift shafts have shift fingers which, depending on the gear the transmission was put in, interlock with gear-specific recesses in the sliding selector shafts who, in turn, are connected with gearshift forks. These gearshift forks again are connected with the sliding collars of the gearshift packages which, for the torsion-resistant connection of loose wheels with a gearshift shaft, are shifted axially on the respective gearshift shaft during a shifting actuation.

Even though this unpublished shifting device is associated with the advantage that, for example, a double clutch transmission with the described gear and gearshift package arrangement, while keeping almost all of its components, can also be used as manual gearbox and can be shifted with an H- or multiple-H-gearshifting gate, the design of the shifting device nevertheless turns out to be mechanically costly.

Therefore, the objective of the invention is to present a shifting device in the form familiar from DE 102 31 547 A1 which includes the advantages stated above, but which is less complex in its mechanical design.

The solution to this objective ensues from the characteristics of the main claim, while favorable further developments and designs of the invention can be taken from the sub-claims.

SUMMARY OF THE INVENTION

The shifting device, according to the invention, therefore, is intended for a multi-step transmission in which at least one gearshift package is allocated to two non-successive gear transmission ratio steps. Each of these gearshift packages is first of all coupled with a gearshift lever through sliding selector shafts and/or gearshift cable and can thus be operated. In this shifting device, a gearshifting diagram is allocated to the gearshift lever in which two successive gear transmission ratio steps are basically arranged opposite to each other in a gearshift path and in which the gear transmission ratios, which can be selected within a gearshift path, are allocated to various gearshift packages.

In order to shift the described transmission with the gearshift lever in this gearshifting diagram, the gearshift lever is connected to a special mechanical conversion device. This conversion device makes it possible that a gearshift lever movement in a gearshift path intended to disengage a preceding gear also leads to a disengagement of the preceding gear in the area of a first gearshift package. Furthermore, a gearshift lever movement in the same gearshift path leads to the engagement of a new gear, also intended for engaging this new gear in the area of a second gearshift package.

According to the invention, this conversion device is structured in such a way, that the gearshift lever is only coupled to one axially displaceable and radially swiveling shift finger shaft, which penetrates the gearshift frames that are each connected with sliding selector shafts. Furthermore, at least one shift finger per gear transmission ratio step or gearshift frame is allocated to the shift finger shaft, and in each of the gearshift frames in the area of its opening there is at least one recess, which respectively is allocated to one of the shift fingers on the gearshift shaft.

The simultaneous engaging and disengaging of the gears in a path occurs via opposite lying fingers on the gearshift shaft. Hereby, counter rotational, translatory movements of two shifting elements to be shifted simultaneously are generated via a gearshift shaft rotation with a constant sense of direction.

When moving the gearshift lever in the selector path of the shifting device to a gearshift path position, an axial displacement of the shift finger shaft takes place, in which one of the shift fingers engages into a recess in the gearshift frame. A movement of the gearshift lever in a gearshift path, however, causes the shift finger shaft to swivel around its longitudinal axis to engage or to disengage a gear, which causes at least one shift finger to axially displace a gearshift frame and the sliding selector shafts that are connected to it.

This shifting device compares quite favorably to the shifting device of the unpublished DE 102 31 547 A1 since, in contrast to this known shifting device, only one shift finger shaft in a mechanically less complex design, instead of two, is necessary to achieve the same technical result.

An adaptation of the invention could be that the opening of the gearshift frames, which are connected to the sliding selector shaft and/or the circumference geometry of the gearshift frames are oval, circular or rectangular. It is a good idea to have the sliding selector shafts and the gearshift frames as one component which could thus be produced in one piece.

Moreover, it is possible to connect the sliding selector shafts with shift rockers, which respectively engage into the sliding collars of a gearshift package that has been placed on a gearbox shaft in an axially displaceable and torsion-resistant manner.

The conversion device of the invention is particularly well utilized when two shift fingers are allocated to each of the gearshift frames. Thus, the two shift fingers assigned to a gearshift frame may be arranged on the shift finger shaft at the same location or also axially successive and, in such a way, that radially, they basically point into the same or opposite directions.

For a specific gearbox, the sliding selector shafts with their gearshift frames are successively arranged in the conversion device in such a way that the gearshift frame for actuating the reverse gear and possibly for actuating a seventh gear is followed by the gearshift frame for actuating the first and third gears; the gearshift frame of the fourth and fifth gears, and the gearshift frame of the second and sixth gear.

The recess in the respective gearshift frames is preferably constructed in such a way that it consists of a gearshift contour in the shifting direction and an engine-to-body-clearance contour in opposite direction, which operate together with the correspondingly aligned gearshift contours on the shift fingers.

To guarantee that only the gear selected by the sliding selector shaft is engaged and that the associated shift finger can only be inserted at a predetermined position of the shift finger shaft into the respective recess in the gearshift frame. The design of the invention provides for the creation of recesses with preferably slanted sidewalls at the shift fingers and/or at positions where the shift finger shafts are attached to the shift fingers. A locking device engages into these recesses to release a shifting action. The locking device is preferably a catch stop at the respective gearshift frame which points to the shift finger shaft, which only allows the intended shift finger to enter into the recess of a gearshift frame.

The shifting diagram of the shifting device of the invention should preferably be in the form of an "H" or a multiple "H", with the shifting positions opposite from each other and in which two gearshift packages are allocated to each gearshift path in the transmission.

The shift finger shaft with its shift fingers, as well as the gearshift frame with respect to an especially compact design of the conversion device, are constructed in such a way that when the shift finger shaft is shifted axially, at least one shift finger is taken out of an engaging position in the recess of a gearshift frame, whereas, at the same time, at least one other shift finger inserts itself into at least one other gearshift frame, comparable to a gearshift path selection.

The radial swiveling of the shift finger shaft around its longitudinal axis, however, leads to an axial displacement of at least one gearshift frame and the sliding selector shaft connected to it so that a gear can be disengaged and/or engaged. For this process, the axial movements of the stated gearshift frames can be in the same or also in the opposite direction.

A different aspect of the invention is that the power transmission ratio of the shifting device can be set by designing the shifting geometry of the recess in the gearshift frame in such a way that the gear shifting forces can be adjusted for different gears. For this set-up, the only limiting factor for the maximum shifting force would be the stability of the component.

In addition, a gear-specific synchronous path can be produced by varying the lengths of the shift fingers.

Finally, an additional useful possible design change of the invention is that the shifting device is actuatable with the help of regulating devices instead of manually which are supported by auxiliary power, whereby the regulating devices are preferably designed as a piston-cylinder-configuration. This arrangement pertains to an automated gearbox or an automated double, clutch transmission. In such a design, one piston-cylinder-configuration is used to axially displace the shift finger shaft and another piston-cylinder-configuration swivels the shift finger shaft. Obviously, in such a suggested automated or automatic transmission, the manual selector with an H- or multiple H-gearshifting gate can be eliminated. Instead, a shifting rocker or another suitable shifting device for selecting the gears can be used.

The axial distance between two gearshift frames corresponds to the width of at least one shift finger. Thereby, the goal that, on the one hand, the gearshift frames are allocated to each other in a compact form and, on the other hand, that a shift finger can swivel into the gap between two gearshift frames, if it is not needed for actuating a gearshift frame, was achieved.

To further develop the invention, we suggest allowing for the gearshift lever to be able to move in the gearshifting gate when changing gears, i.e., the gearshift lever can basically be moved diagonally in the gearshift path. This is achieved in that either the contour of the gearshift frame or the contour of the engaging area of the shift fingers is constructed to allow for the gearshift lever to move diagonally. In doing so, the width of the engaging area of the shift fingers could be smaller than the width of the shift finger in the area of its hub.

To further enhance the design of the invention, it is possible to position the shift finger on the shaft in such a way, that the shift fingers, when shifted into neutral gear, do not run perpendicular to the sliding selector shafts or the gearshift frames, but are positioned diagonally to the sliding selector shafts or the gearshift frames.

When putting the car in gear by pushing the gearshift lever, the respective shift finger is then swiveled into a position, which is basically arranged perpendicularly to the sliding selector shaft or to the gearshift frame.

To further enhance the design of the invention, it is possible to provide for a shift finger which could actuate a gearshift package or engage and disengage two gears. This shift finger would work together with a gearshift frame. The suggested compact design requires only a few parts.

Advantageously, in the above described design the one shift finger for actuating of a gearshift package acts together with a recess of a gearshift frame.

As opposed to the above described design with several shift fingers per gearshift frame, when dealing with the arrangement of one shift finger in a gearshift frame, it is also possible that the shift finger utilized for actuating a gearshift frame is arranged on the shift finger shaft in such a way, that the shift finger, when placed in neutral, basically runs perpendicular to the sliding selector shaft or the gearshift frame. In order to put the car in gear by actuating the gearshift lever, the shift finger is swiveled into an angled position, which is not perpendicular to the sliding selector shaft or the gearshift frame.

In the above described design of the shifting device it is, therefore, possible to shift four gears with two shift fingers.

In the same way, the course of motion of a gearshift lever can be predetermined by the geometry of the gearshift frames or the catch stops so that the function of a gearshifting gate for a manual gearshift lever can be represented expediently by the gearshift frame and/or by the catch stops. Thereby, through a special construction of the shifting device, the gearshift lever can perform a basically diagonal path when changing from one gear in a gearshift path to an adjacent gear in another gearshift path.

Apart from the shifting device described above, the invention also applies to motor vehicle transmissions that contain a shifting device with the characteristics described above. It is irrelevant, whether the transmission is constructed as manual gearbox with a conventional gearshift lever, such as an H-shifting diagram (pattern) or as an automated gearbox or also as an automatic transmission with a selector, a shifting rocker or a similar device with suitable means of actuation.

The motor vehicle transmission, if constructed according to the invention, may also be built as a countershaft transmission, which consists exclusively of loose wheels gearshift packages are allocated to those wheels and one gearbox shaft each is allocated to the packages' respective torsion-resistant connection.

To further build upon the design of the invention, it is possible to construct the motor vehicle transmission as a double clutch transmission or also as a transmission with a double clutch wheel with only one start clutch.

BRIEF DESCRIPTION OF THE DRAWINGS

The invention will now be described, by way of example, with reference to the accompanying drawings in which.

DETAILED DESCRIPTION OF THE INVENTION

Figure 1:
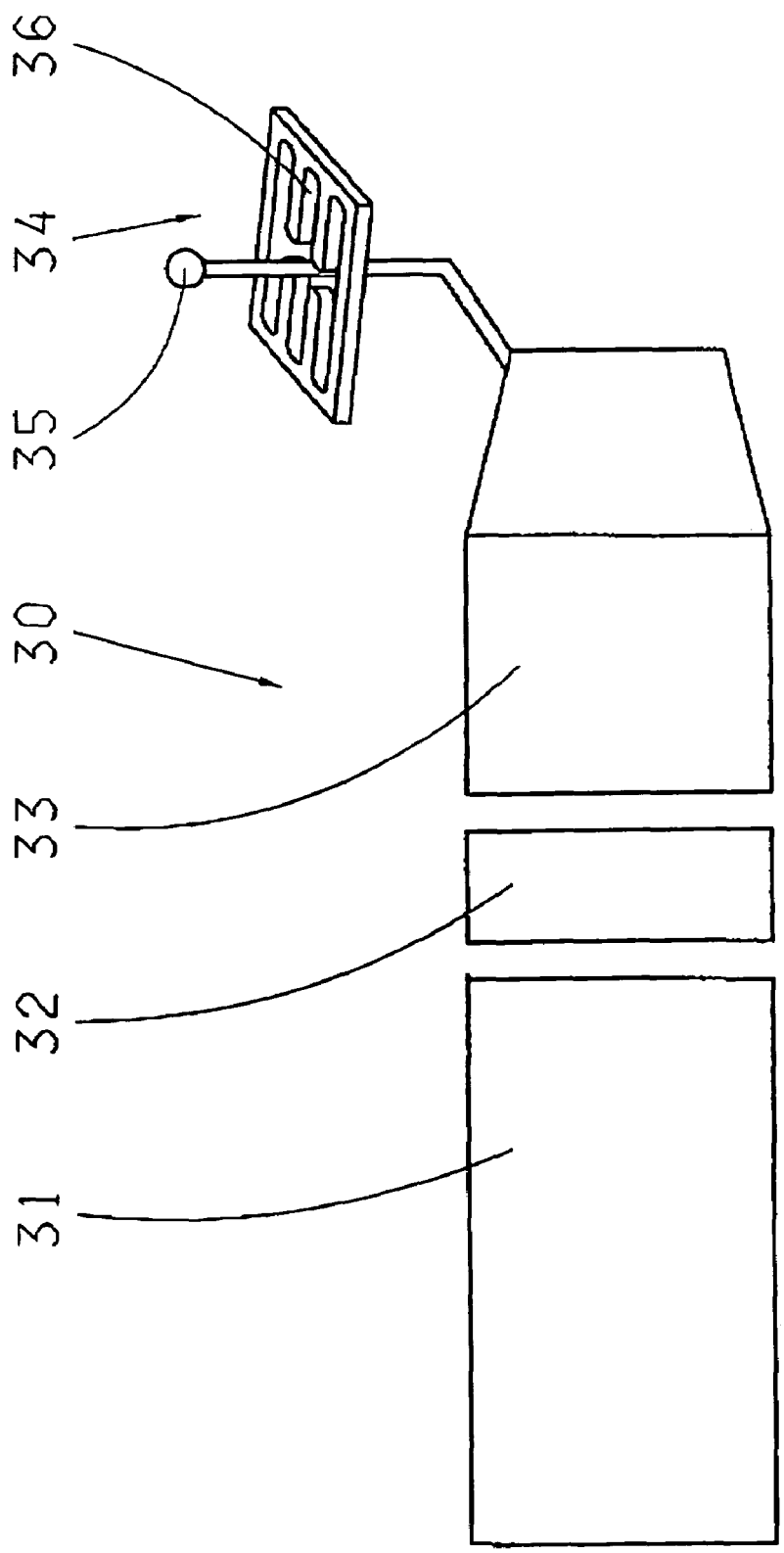
FIG. 1 shows a diagram of a car's power train.

Thus, FIG. 1 shows the already known construction of a power train 30 of a vehicle with a driving motor 31, a start and shifting clutch 32 and a manual transmission 33. The transmission 33 can be operated with a manual shifting device 34 in order to set the gear transmission ratio. The shifting device 34 has a gearshift lever 35 for this purpose, which is guided in a multiple H-gearshifting gate 36. The gearshift lever 35 of this shifting device 34 or a cable system (not shown), is also connected via a gearshift linkage with a gearshifting shaft, which is inside the transmission 33 and coupled with gearshift mediums, which can change the gear transmission ratio in the transmission.

Figure 2:
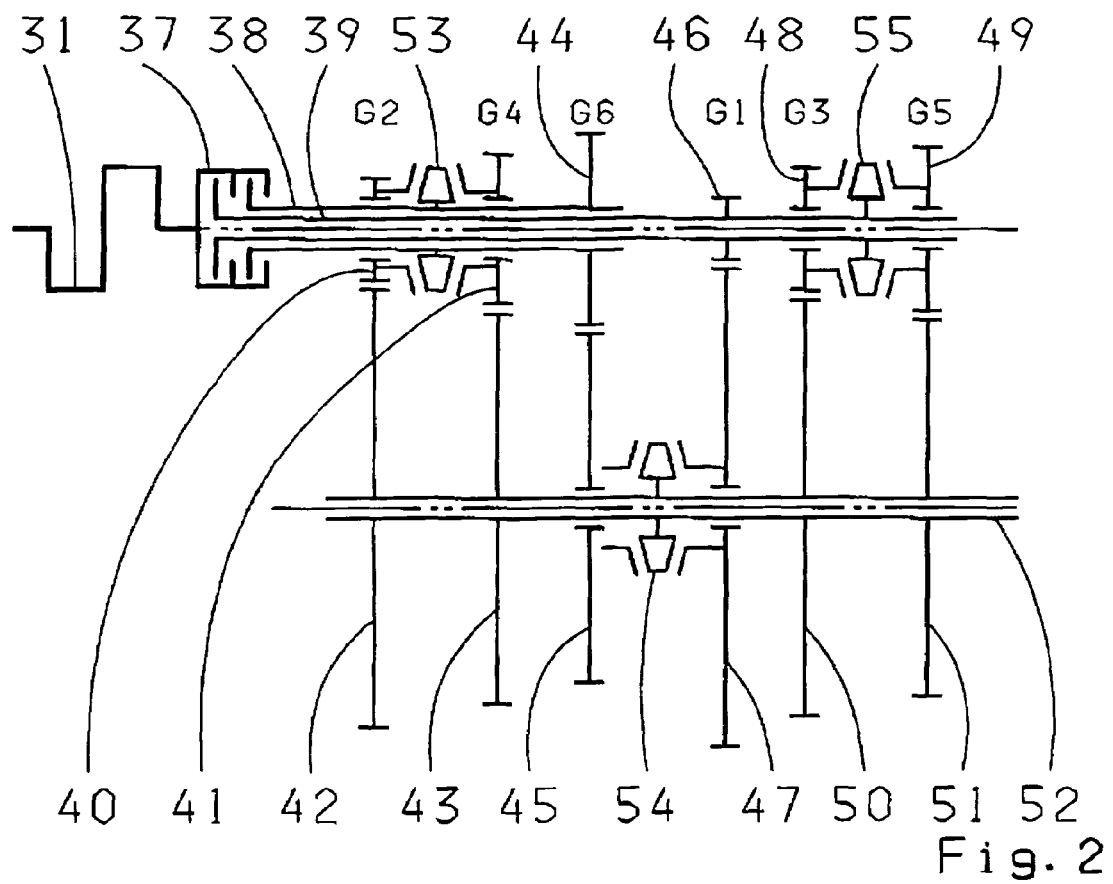
FIG. 2 shows a diagram of the construction of a double clutch transmission.
Figure 3:
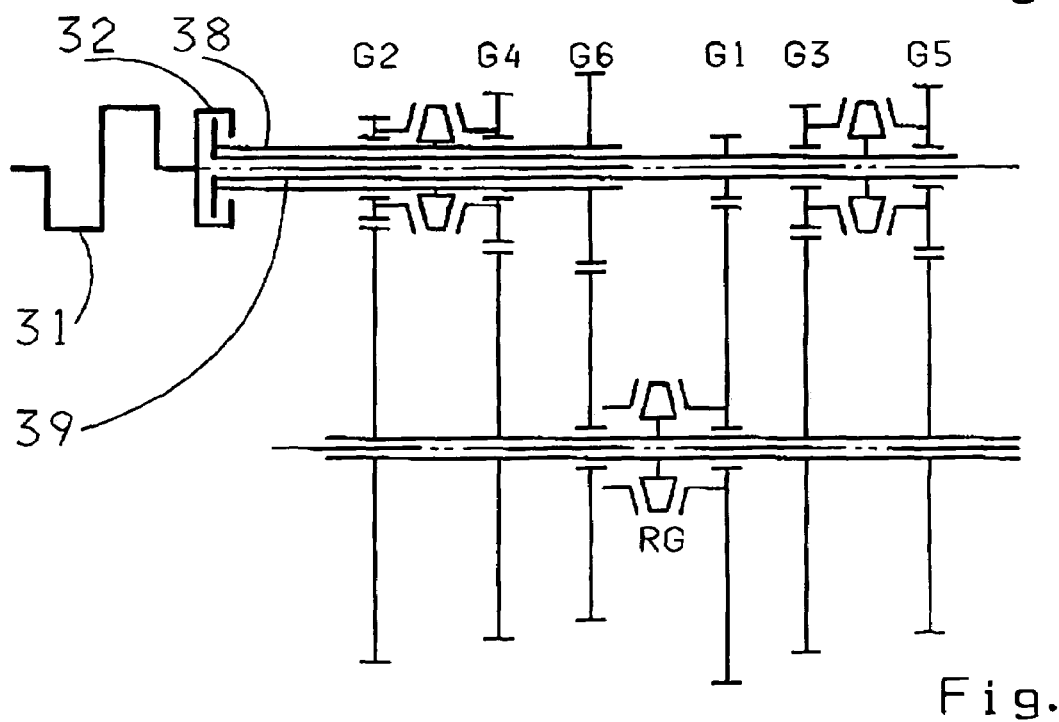
FIG. 3 shows diagram of the construction of a manual gearbox with a double clutch gearset.

According to FIG. 1, the transmission 33, which can be operated by the shifting device 34 in order to set the gear transmission ratio, can be built as double clutch transmission (FIG. 2) or as single clutch transmission (FIG. 3). In each case, however, it is a transmission in which two gear pairs, arranged next to each other, cannot be selected in the same gearshift path by the gearshift lever 35 in the shifting device 34.

Thus, FIG. 2 simply illustrates the state of the art design of a double clutch transmission, which is connected on the input side via a double clutch 37 with the driving motor 31, which is shown here as a combustion engine. To do so, the double clutch transmission has two input shafts 38, 39 on the input side, which are each connected with one clutch of the two clutches of the double clutch 37.

The double clutch transmission is furthermore designed in such a way that even-numbered gears G2, G4, G6 and odd-numbered gears G1, G3 and G5 each sit on one of the two input shafts. The gear transmission ratio steps of the even gears hereby are on the first input shaft 38, which is designed as a hollow shaft, whereas the odd gears are arranged on the second input shaft 39, which is positioned inside the hollow shaft 38.

The gear transmission ratios of the second and fourth gears G2, G4 are formed by loose wheels 40, 41 on the first input shaft 38, and fixed wheels 42, 43 are positioned on a countershaft 52, whereas a fixed wheel 44 on this hollow input shaft 38 and a loose wheel 45, combined with the countershaft 52, form the gear pair for the sixth gear G6.

Furthermore, on the second input shaft 39, a fixed wheel 46 is in toothing engagement with a loose wheel 47 on the countershaft 52 forming the first gear G1, whereas two loose wheels 48, 49 on the second input shaft 52 combined with fixed wheels 50, 51 on the countershaft 52 form the third gear G3 and the fifth gear G5.

In order to simplify the illustration, gear tooth forming wheels for the seventh gear or the reverse gear have been omitted.

So-called gearshift packages 53, 54, 55 are arranged between the loose wheels 40 41; 45, 47, as well as 48, 49, which consist mainly of sliding collars and synchronize rings, which are axially displaceable but arranged torsion-resistantly on the shafts 38, 39, 52, according to present day technology. These gearshift packages 53, 54, 55 make it possible to connect the respective loose wheels 40, 41, 45, 47, 48, 49 torsion-resistantly with the gearbox shafts 38, 39, 52, so that it is possible to add or remove individual gear transmission ratio steps.

In order to be able to perform load shifts with such a double clutch transmission without interrupting the traction force, the gear ratio of the target gear is already put into the gear prior to the actual shifting action with a disengaged clutch. During the shifting action in the transmission, an overlapping gearshift occurs in which the clutch of the target gear is engaged and the clutch of the previous gears is disengaged in a parallel position to it. Here, the torque transfer of the double clutch engine torque from the previous to the new, to be engaged clutch takes place, whereby the activation of the double clutch 37, as well as the actuation devices for the sliding collars of the gearshift packages 53, 54, 55, is done automatically by a control unit, which is not shown here.

FIG. 3 shows a double clutch gearset according to FIG. 2 in a manually shifted power train. Thereby, only a starting and shifting clutch 32, which is actuated by the driver and whose output side is drive-technically connected to the two input shafts 38, 39, lies between the combustion engine 31 and the transmission.

Even though a single input shaft, instead of the two input shafts 38, 39, can be used for this manual transmission, the utilization of the same core transmission as in the double clutch transmission according to FIG. 2 has some cost advantages. The use of a conventional shifting device for this transmission would, however, require a shifting diagram in the gearshifting gate, which would be unnatural for the driver. In this diagram, the gears G2 and G4 would be in one gearshift path, whereas the gears G1 and G6, as well as G3 and G5 would be allocated to different gearshift paths.

Therefore, this technical problem is a starting point for the manual shifting device of this invention, which makes it possible to shift a transmission by using an H- or multiple H-gearshifting gate in which two gears in the gearshift path of the shifting device in the transmission do not come into contact with two gear wheel pairs, which are situated next to each other and can be actuated by a sliding collar. For this purpose, the shifting device of the invention is equipped with a conversion device which is shown in FIG. 4.

This conversion device has a shift finger shaft 1, which is mechanically coupled with the manual gearshift lever 35, which can be displaced axially in direction of arrow 18, as well as swivelled according to arrow 19 around its longitudinal axis and is contained in a transmission case (not shown here). Shift fingers 2, 3, 4, 5, 6, 7, 8 have been mounted cam-like onto the shift finger shaft 1, facing radially outside; some of them face in the same direction, whereas other shift fingers face in the opposite direction. Furthermore, some of the shift fingers 2, 3, 4, 5, 6, 7, 8 have been mounted direct after each other or with a gap.

Figure 4:
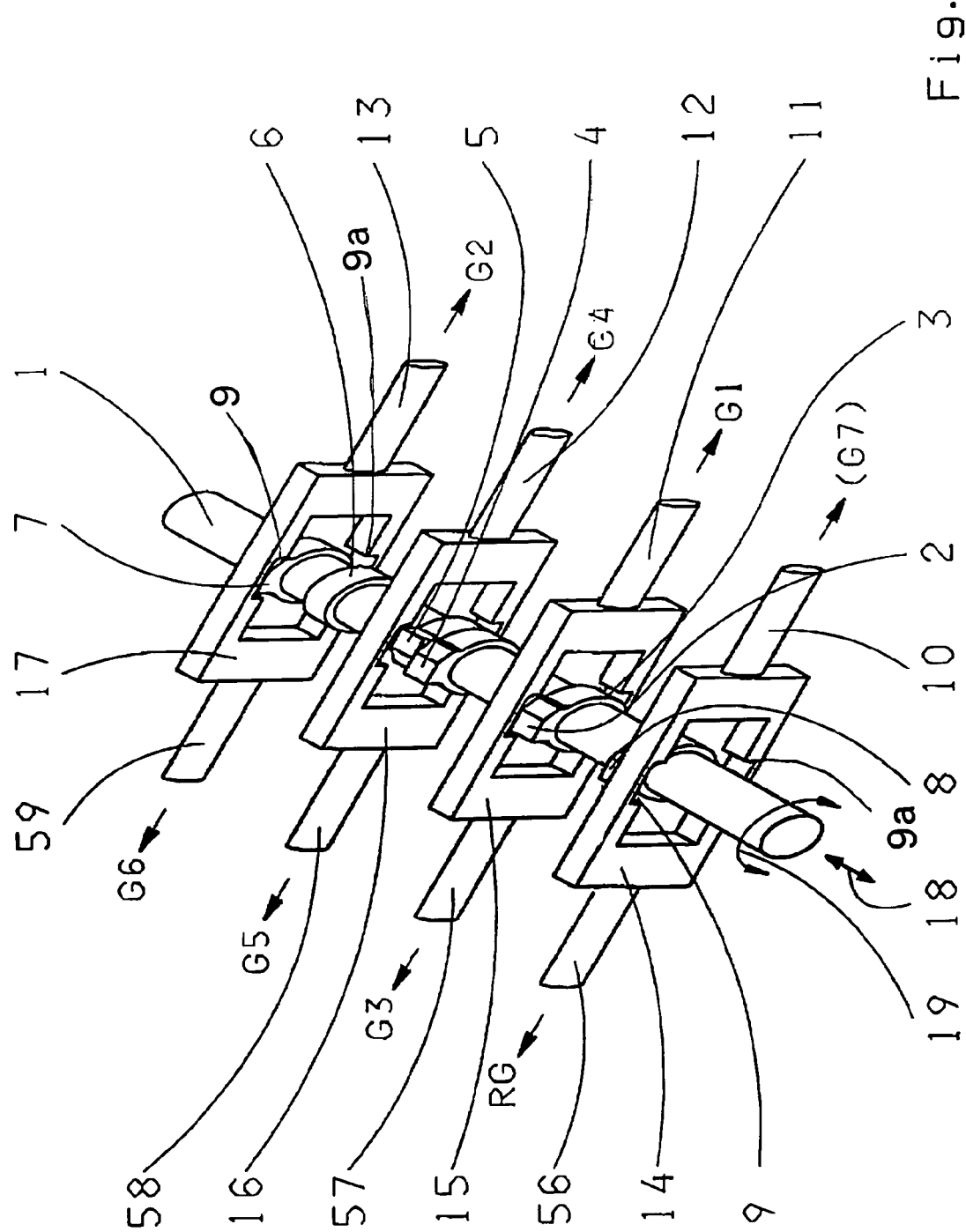
FIG. 4 shows a three-dimensional view of a conversion device constructed according to the invention.

As explained in FIG. 4, the shift finger shaft 1, respectively, inserts itself into the opening of gearshift frames 14, 15, 16, 17, which have a rectangle form in this design, at the right or left end of the gearshift frames, where sliding selector shafts 10, 11, 12, 13, 56, 57, 58, 59 are mounted. On their free end, these sliding selector shafts 10, 11, 12, 13, 56, 57, 58, 59 are connected with gearshift forks (not shown here), which engage into sliding collars of the gearshift packages 53, 54, 55.

The sliding selector shafts 10, 11, 12, 13, 56, 57, 58, 59 and the gearshift frames 14, 15, 16, 17, respectively, may also be produced as one component, for example by using a flexible cutting die.

The gearshift frames 14, 15, 16, 17 each have a recess 9 at their opening, in which one of the respective shift fingers 2, 3, 4, 5, 6, 7, 8 can engage coaxially to directional arrow 18 in an axial displacement of the shift finger shaft 1. By swivelling the shift finger shaft 1 around its longitudinal axis, according to the directional arrow 19, one or several of the shift fingers 2, 3, 4, 5, 6, 7, 8 displace one or several of the gearshift frames 14, 15, 16, 17 with the sliding selector shafts 10, 11, 12, 13, 56, 57, 58, 59 attached to them, which displaces the sliding collars mentioned above in an axial manner. By systematically positioning the shift fingers 2, 3, 4, 5, 6, 7, 8 on the gearshift shaft 1, a reverse gear RG of the transmission, for example, can be activated through shift finger 8, the gearshift frame 14 and the sliding selector shaft 56.

Furthermore, by producing a second recess in the gearshift frame 14, and by positioning an additional shift finger in the area of shift finger 8 on gearshift shaft 1 with the sliding selector shaft 10, the system could engage or disengage a seventh gear G7.

As explained in FIG. 4 with respect to the first and third gears G1 and G3, shift fingers 2, 3, which are essentially positioned opposite each other, engage into opposing recesses on gearshift frame 15. The third gear G3 or the first gear G1 is actuatable due to the resulting axial displacement of the gear shift frame in coaxial relationship to sliding selector shafts 11, 57 that are mounted to it.

For the axial displacement of gearshift frame 16, together with its sliding selector shafts 12, 58, on the shift finger shaft 1, two shift fingers shaft 4, 5 are mounted directly behind one another. They engage as selected into the recess of the gearshift frame 16 directly above them. The fourth gear G4 and the fifth gear G5 is actuated due to this design.

Finally, FIG. 4 shows that the sixth gear G6 and the second gear G2 can be shifted with shift fingers 6, 7 engaging as selected into the opposite lying recesses 9, 9a of the gearshift frame 17, and with the sliding selector shafts 13, 59 when swiveling the shift finger shaft 1.

Figure 5:
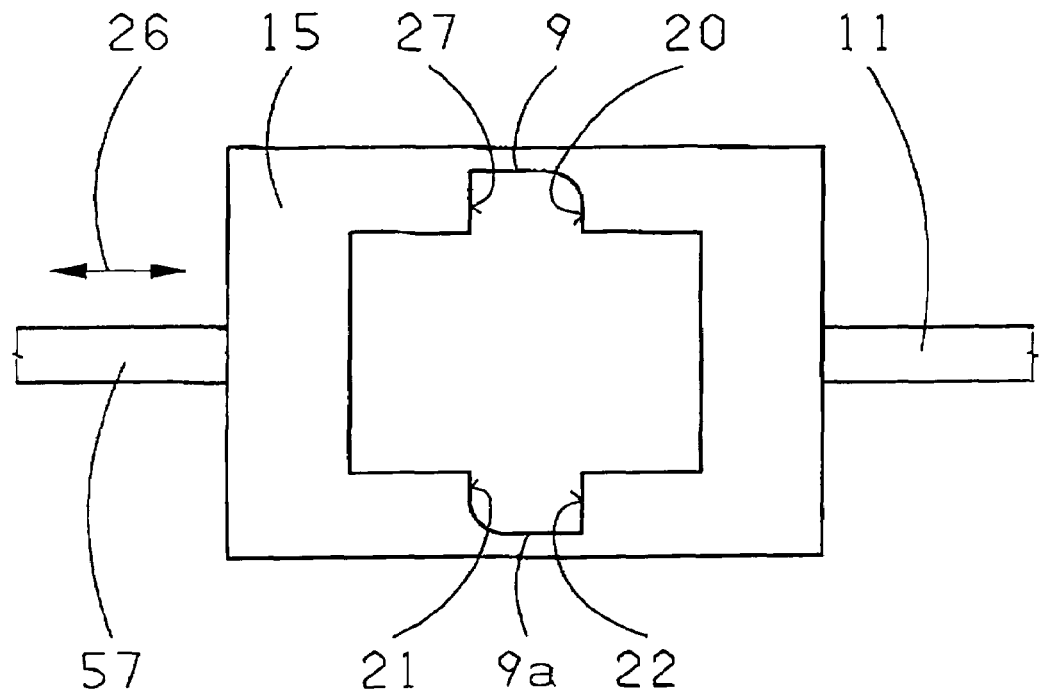
FIG. 5 shows a detailed view of a gearshift frame with its sliding selector shafts.

FIG. 5 depicts gearshift frame 15 from the side and represents all other gearshift frames. The sliding selector shafts 11, 57 are connected to this gearshift frame 15. They can actuate the first gear G1 and the third gear G3 via the already described gearshift packages 54, 55. This illustration shows particularly well that the two recesses 9, 9a are located in the gearshift frame 15 in such a way that they each have an essentially radially straight gearshift contour 22, 27 and a curved engine-to-body-clearance contour 20, 21.

Figure 6:
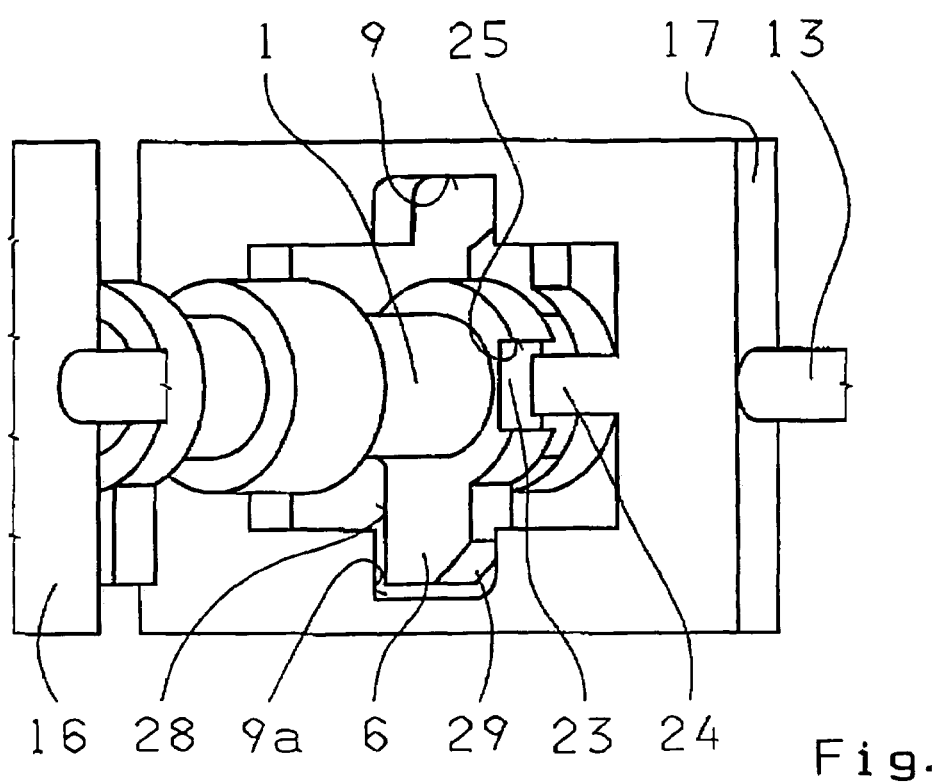
FIG. 6 shows a gearshift frame which is penetrated by a shift finger shaft.

These two types of contours make it possible that shift fingers 2, 3 with similar exterior geometry (locking contour 28 and curved or an angular engine-to-body-clearance contour 29 on shift finger 6 as in FIG. 6) engaging into the respective recesses 9, 9a can move into the gearshift frame 15, and can displace it in an axis-parallel manner to directional arrow 26 to the left in order to put the transmission in third gear G3, and to the right in order to put the transmission in first gear G1. On the other hand, the engine-to-body-clearance contours 20, 21 make it possible to unscrew the shift fingers 2, 3 from the recesses 9, 9a without any problems.

In as far as two shift fingers 2, 3 are supposed to engage alternatively to each other into a gearshift frame 15, the gearshift contours 22, 27 and the engine-to-body-clearance contours 20, 21 are aligned opposite to each other in the two recesses 9, 9a lying opposite to these two, as is shown in FIG. 5, in order to respectively allow the other shift finger to glide out without any problem when a gear is put in.

Another way this invention can be used is shown in FIG. 6. It is possible to create a recess 23 each with angular side walls 25 at the shift fingers 6 or on the respective locations for the shift fingers on shift finger shaft 1. A locking device, preferably a catch stop 24, can engage into this recess. This catch stop 24 then forms a part of each gearshift frame and protrudes radially towards the interior of the shaft 1 or into a lateral recess 23 of the shift finger 6.

The catch stop 24 makes it possible for only one specific shift finger 6 and/or a random shift finger can engage in a specific swivel position of the shift finger shaft 1 into the recess 9. In all other movements or swivel positions of the shift finger shaft 1, the respective catch stop 24 locks into the assigned recess 9 of the respective gearshift frame 17.

What is particularly interesting about this conversion device is the fact that with only one camshaft (shift finger shaft 1), seven forward gears and one reverse gear can be shifted. For this purpose the shift fingers 2, 3, 4, 5, 6, 7, 8 on the shift finger shaft 1, as well as the coupling of the sliding selector shafts 10, 11, 12, 13, 56, 57, 58, 59 with the sliding collars of the gearshift packages 53, 54, 55 are selected and aligned in such a way, that when gearshift lever 35 in the gearshift path of the shifting device 34 takes out a gear, first of all, a gear in the transmission is taken out through a first gearshift frame. When shifting to the next gear in the same path of the shifting device 34, an additional parallel rotation of the shift finger shaft 1 in the same rotational direction occurs, which puts the other gear of the same gearshift path in the transmission into gear by using a second gearshift frame.

Figure 7:
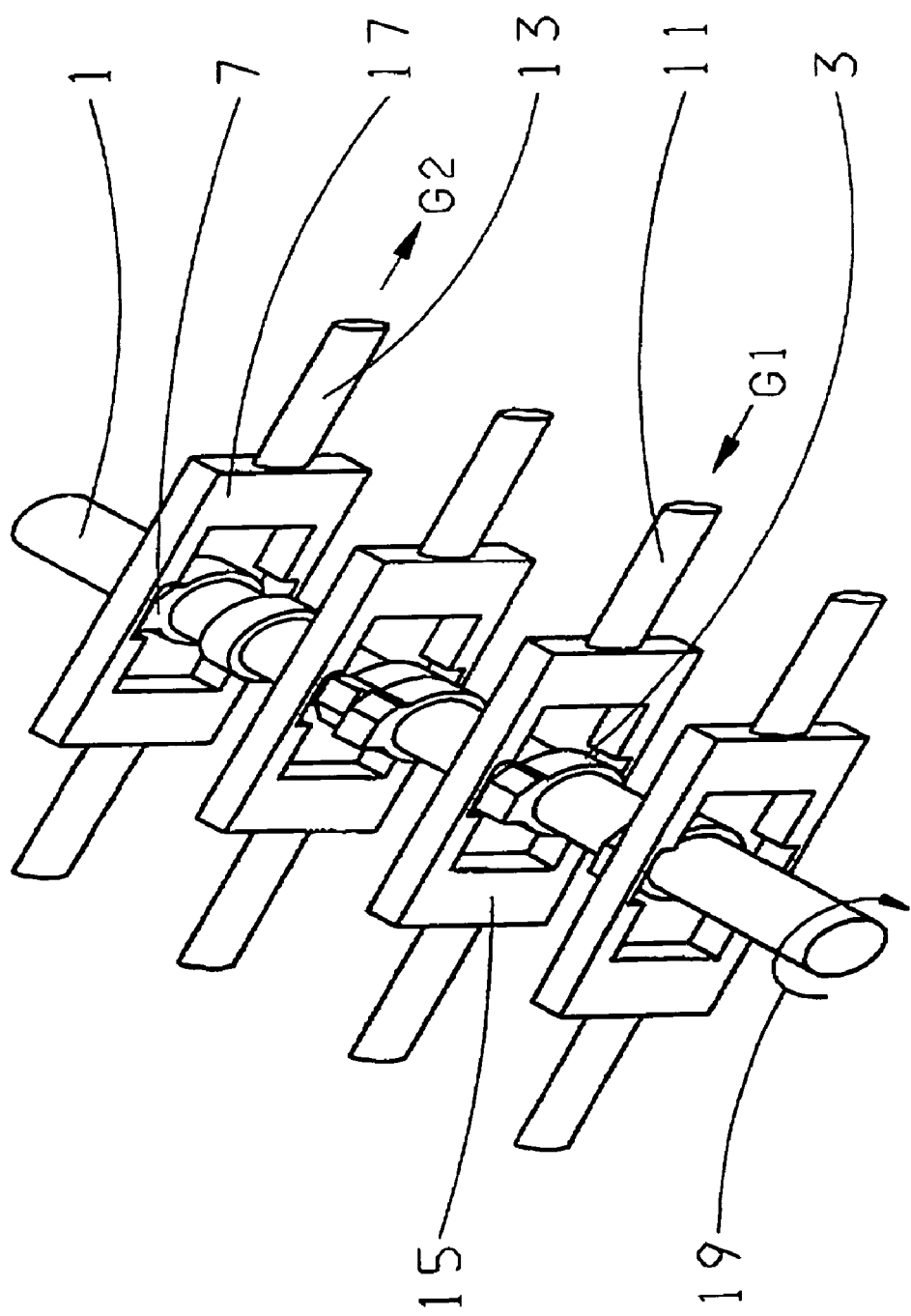
FIG. 7 is an overview of the conversion device shifting from the first into the second gear.

As is shown in FIG. 7, when a gear is shifted in the same gearshift path from first gear G1 to second gear G2, the shift finger shaft 1 is positioned in the openings of the two gearshift frames 15, 17 in such a way, that shift finger 3 and shift finger 7 are inserted into the recesses of the gearshift frames 15, 17. Swiveling the shift finger shaft 1 to the right moves the gearshift frame 15 together with the sliding selector shaft 11 to the left into neutral, so that the first gear G1 is taken out. At the same time, by displacing the gearshift frame 17, shift finger 7 moves, together with the sliding selector shaft 13, moves from a neutral position to the right so that the second gear G2 can be put in.

Figure 8:
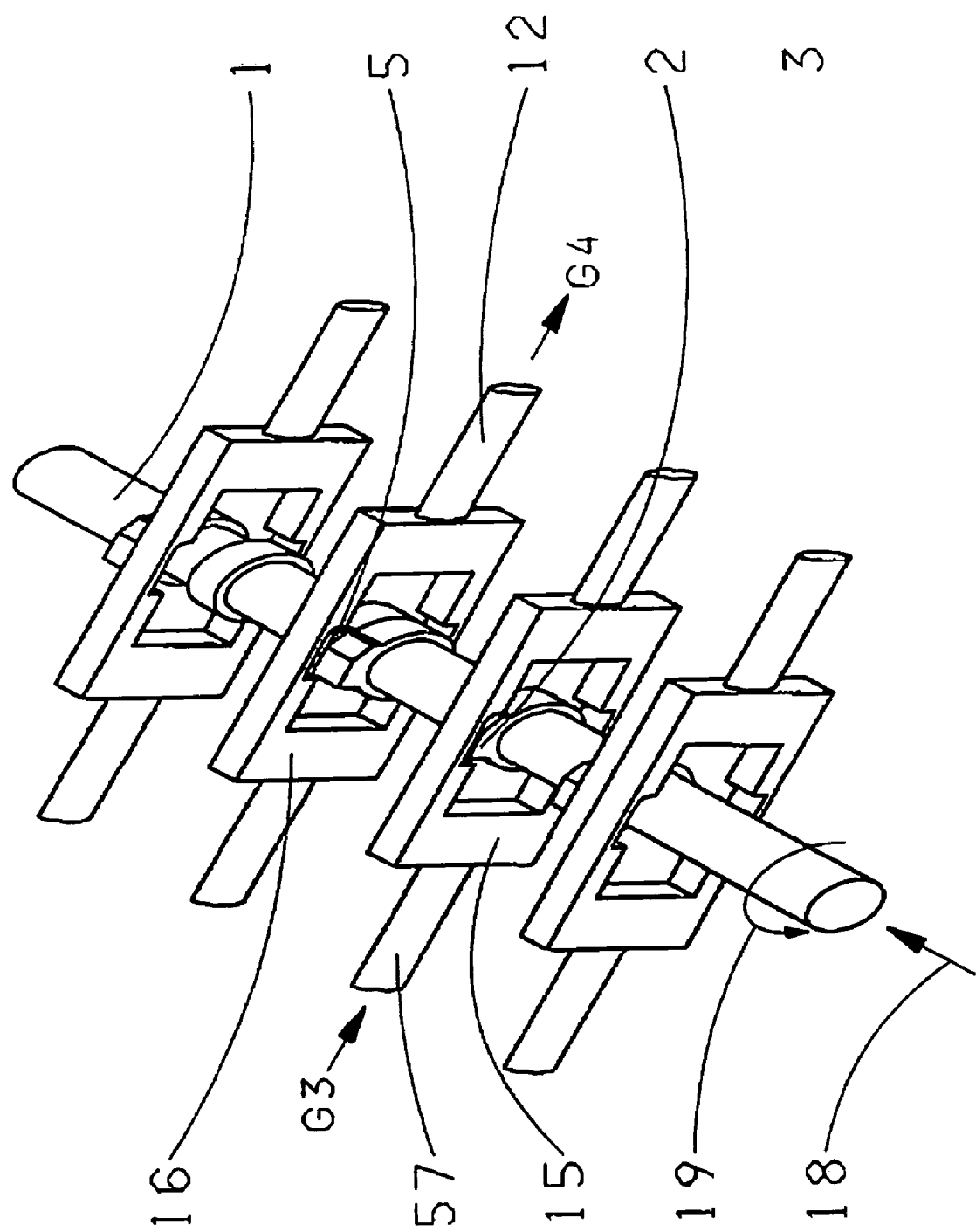
FIG. 8 is an overview of the conversion device shifting from the third into the fourth gear.

Though, according to FIG. 8, shifting from the third gear G3 into the fourth gear G4 does not occur according to the same pattern, in this case the two gearshift frames 15, 16 move to the right side by swiveling the shift finger shaft 1 to the left (arrow 19). This way, shift fingers 2, 5 take out the third gear G3 and bring it to the neutral position, which puts in the fourth gear G4.

Figure 9:
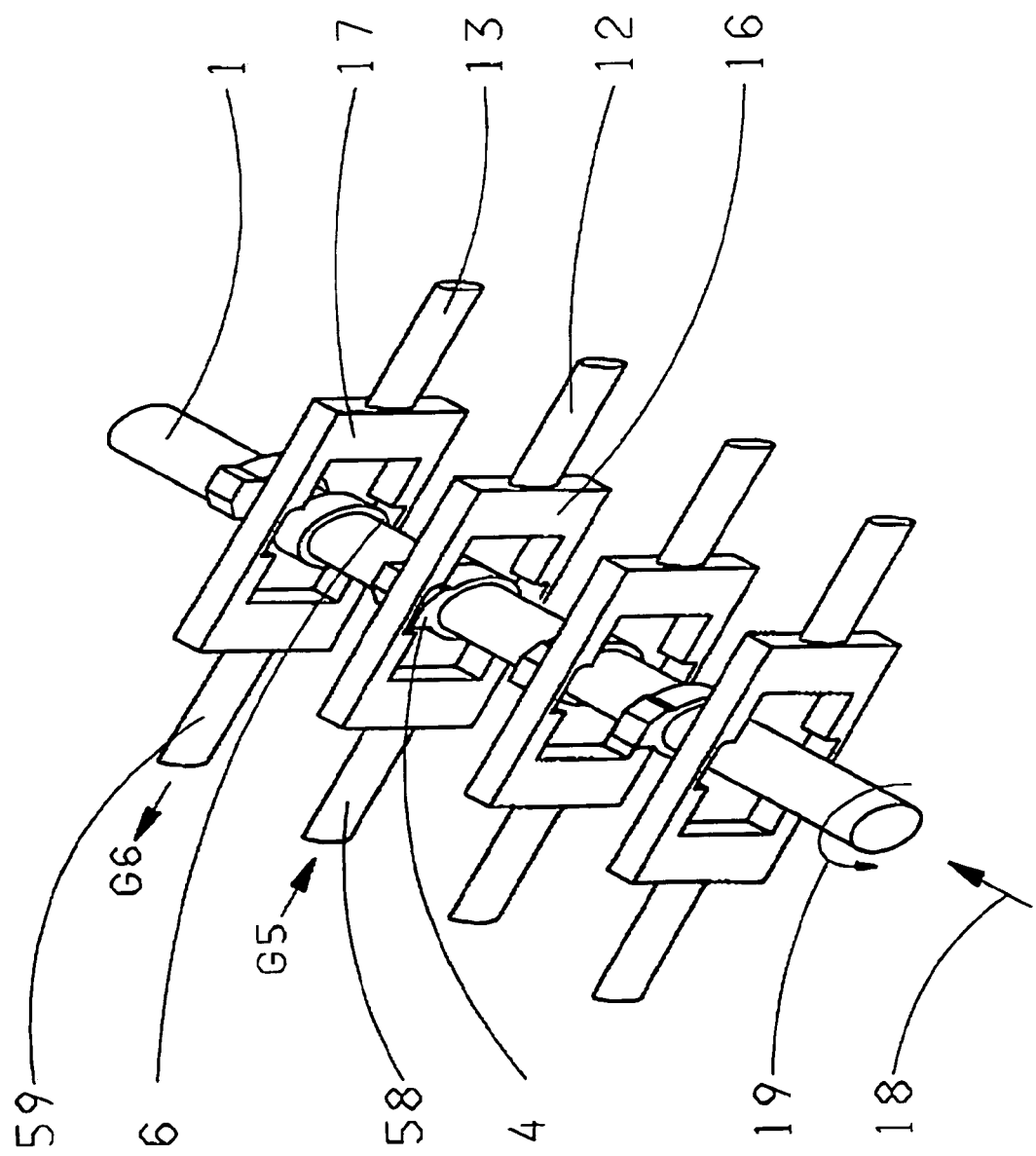
FIG. 9 is an overview of the conversion device shifting from the fifth into the sixth gear.

As shown in FIG. 9, for shifting from the fifth gear G5 into the sixth gear G6, the shift finger shaft 1 is displaced axially according to directional arrow 18 in the openings of the gearshift frames 16, 17 in such a way that shift fingers 4, 6 engage into the recesses of the gearshift frames 16, 17 assigned to them. A swivelling of the shift finger shaft 1 to the right according to directional arrow 19 has the result, that the gearshift contour 28 of the shift finger 6 lies against the gearshift contour of the gearshift frame 17 (FIG. 6). In order to put the car into sixth gear G6, the gearshift contour 28 transports gearshift frame 17 together with the sliding selector shaft 59 to the left, from a neutral position into the shifting position, whereas the shift finger 4 engages with its gearshift contour into the gearshift contour of the gearshift frame 16 and displaces this gearshift frame 17 to the right for taking out the fifth gear G5.

Figure 10:
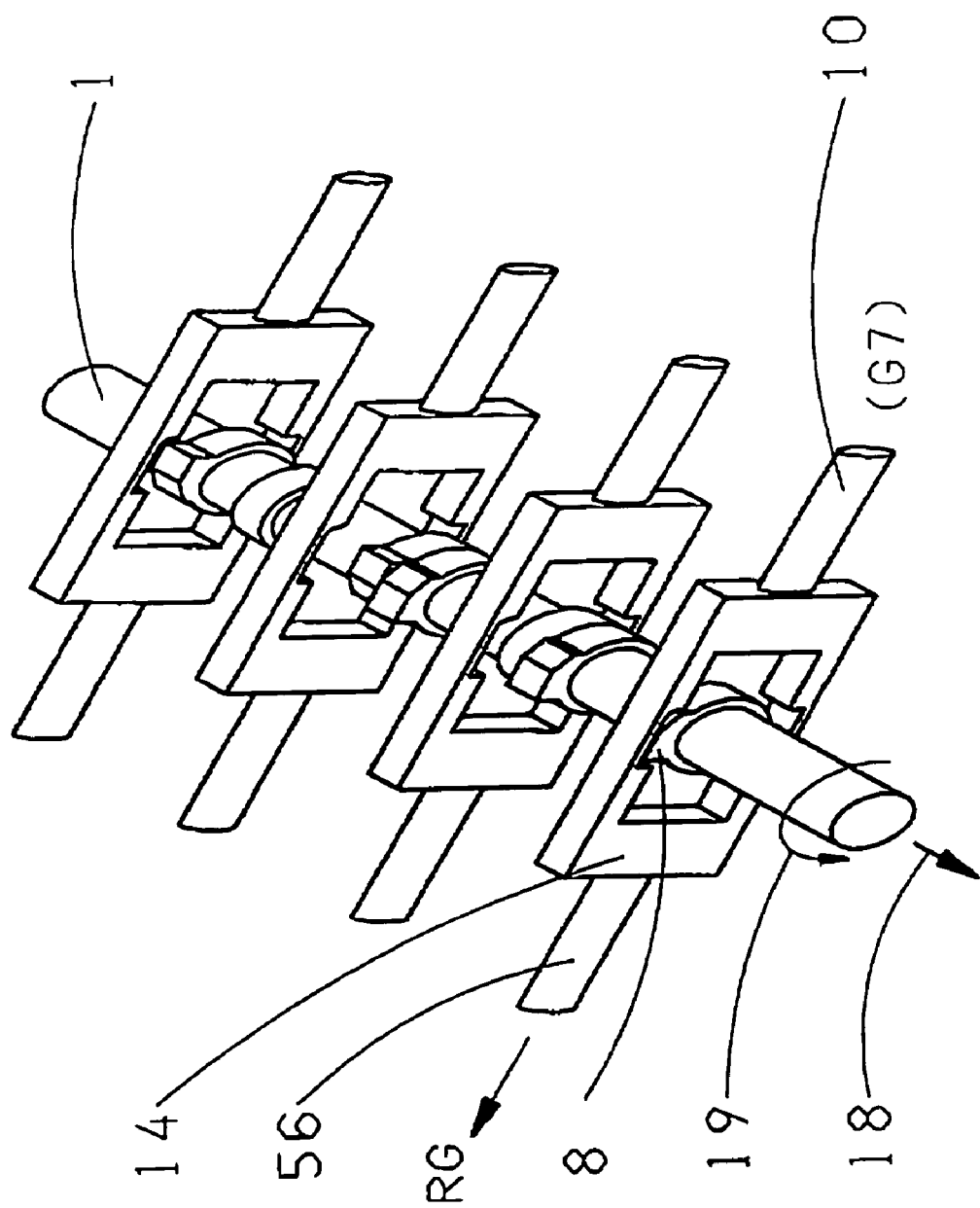
FIG. 10 is an overview of the conversion device shifting into reverse gear.

Finally, FIG. 10 shows the conversion device in a shifting position in which the shift finger shaft 1 is displaced axially so far in direction of directional arrow 18 by an according path selection of the gearshift lever 35 in the shifting device 34, that the shift finger 8 engages into a recess in the gearshift frame 14. When swivelling the shift finger shaft 1 to the left according to directional arrow 19, the shift finger 8 pushes the gearshift frame 14 with its sliding selector shaft 56 to the left, so that the reverse gear RG is put in.

However, this FIG. 10 also indicates, that the right side of the gearshift frame 14 may also be connected with a sliding selector shaft 10 through which, for example, the seventh gear G7 of a seven-gear transmission can be shifted. For this purpose, merely an additional recess has to be positioned in the gearshift frame 14 and an additional shift finger has to be positioned on the shift finger shaft 1.

If the gears in the transmission are in a difficult position, it may be necessary to have the same number of gears as there are shift fingers. If the gears in the design of the transmission are, however, designed so that the respective second gear is in the same shifting direction, four gears can be shifted with two shift fingers, since the gearshift path has to be changed. As is shown in FIG. 11, this reduces the minimum distance between two gearshift frames from three times the shift finger width to one shift finger width.

Figure 11:
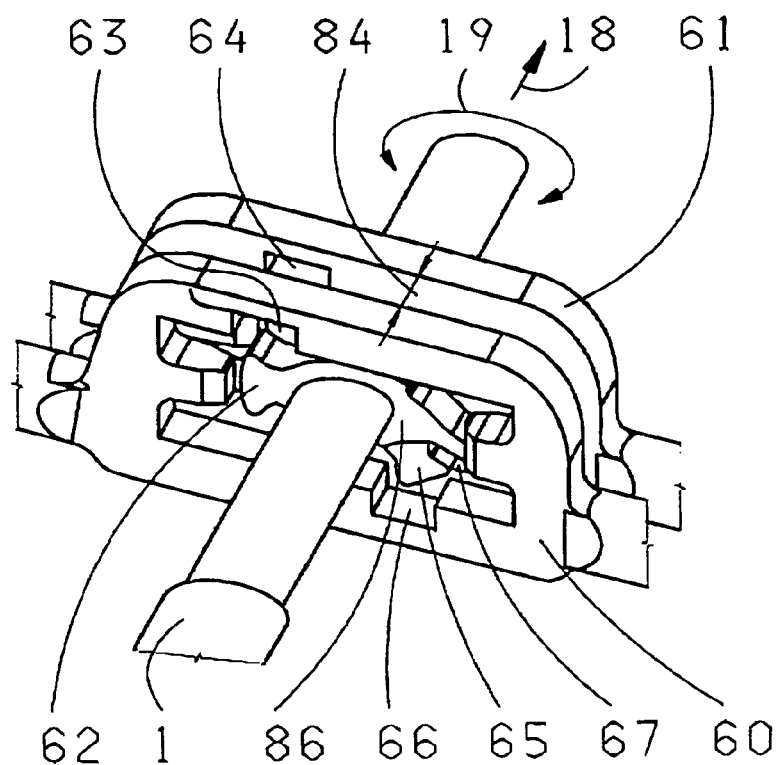
FIG. 11 is a side view of two gearshift frames arranged very closely next to each other.

The conversion device can be extremely short as shown in FIG. 11. In this version of the invention, two gearshift frames 60, 61, used for shifting the fifth and sixth gears, are arranged so tightly behind each other or the third and first gears, that their axial distance merely corresponds to one shift finger hub width. This design makes it possible to shift the seventh gear with a shift finger 62 located on the shift finger shaft 1, engaging into the recess 63 of the gearshift frame 60 and by swivelling the shift finger shaft 1 according to directional arrow 19, and the fifth gear can be shifted with shift finger 86, which is arranged axially at the same site on the shift finger shaft 1 and which points into the opposite direction.

For shifting the first or third gear, the shift finger shaft 1 is displaced axially the distance of the component width 84 in direction 18 by one shift finger width, so that for shifting the first gear, a shift finger 65 can insert itself into a recess 67 of the gearshift frame 61, and the gearshift shaft can be swivelled axially. For putting the transmission into third gear, the shift finger shaft 1 is kept axially at the same position and is swivelled into the opposite direction according to directional arrow 19, so that a shift finger (not shown here) can penetrate a recess 64 of the gearshift frame 61 and displace it to the right.

Figure 12:
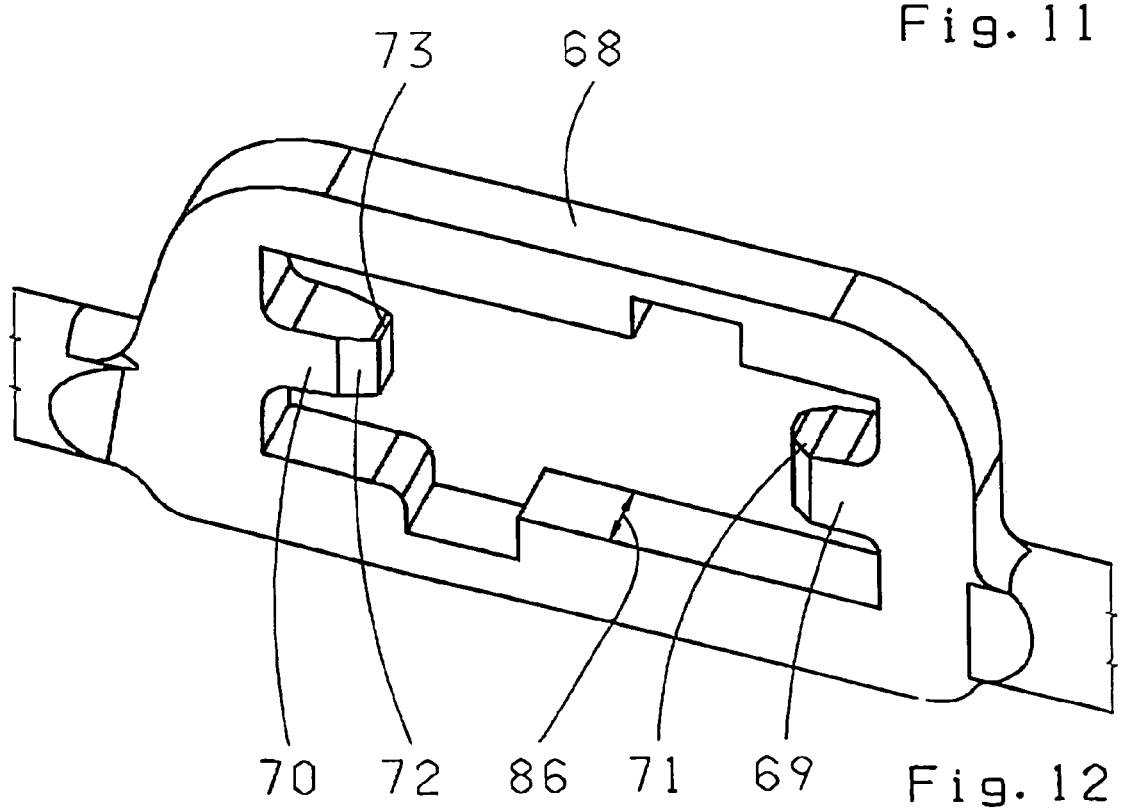
FIG. 12 is a gearshift frame with clearly visibly profiled catch stops.

With respect to the catch stop geometry, the illustration of a gearshift frame 68 in FIG. 12 clarifies that the surface contours 71, 72, 73 of the catch stops 69, 70, apart from their function to release a shift finger for penetrating into the gearshift frame, also influence the shifting geometry, through which a gearshift lever can be displaced in its gearshifting gate.

Figure 13:
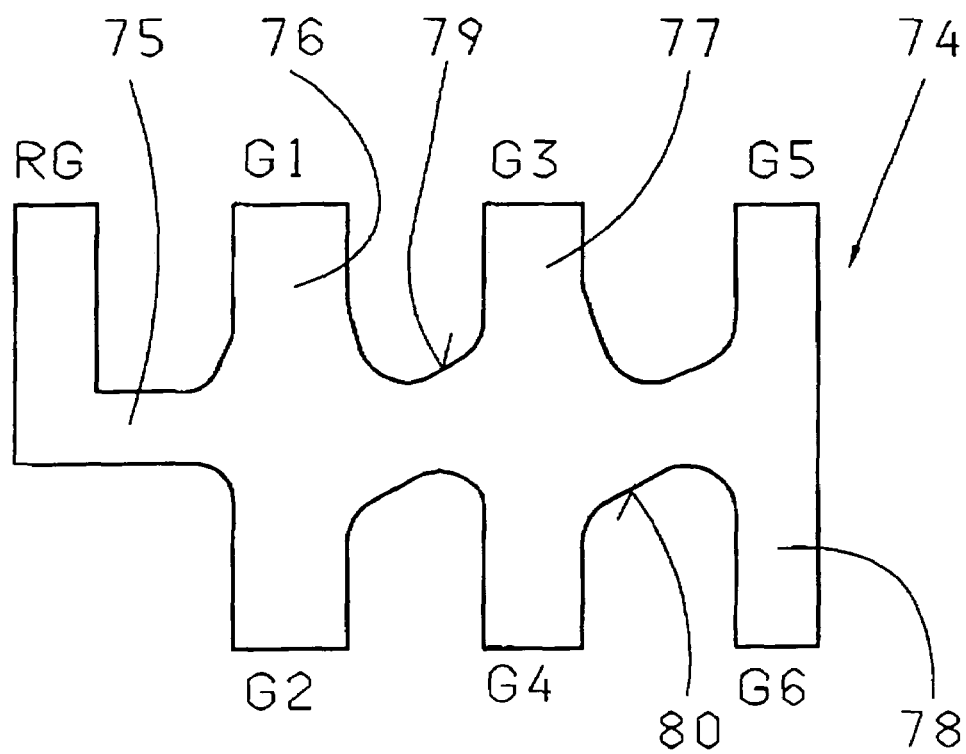
FIG. 13 is a movement shifting diagram of a gear selector generated through measurement technology.

FIG. 13 shows a course of motion 74 of a gearshift lever 35, based on some measurements, which is connected with a conversion device of the invention, in its gearshifting gate 36.

As is easily visible, this gearshifting gate 36 is constructed as HH-gear shifting gate, in which the gearshift lever 35 can be moved in a selector path 75, and four gearshift paths. The shifting actions in gearshift paths 76, 77, 78 for shifting the first to sixth gear G1 to G6 clearly shows that the contours 71, 72, 73 of catch stops 69, 70 influences the shape of the diagonal shifting diagram (pattern) 79, 80 in such a way that, especially when changing from one gearshift path G1-G2 to the next gearshift path G2-G3, the surface feel can be positively influenced by the driver.

Figure 14:
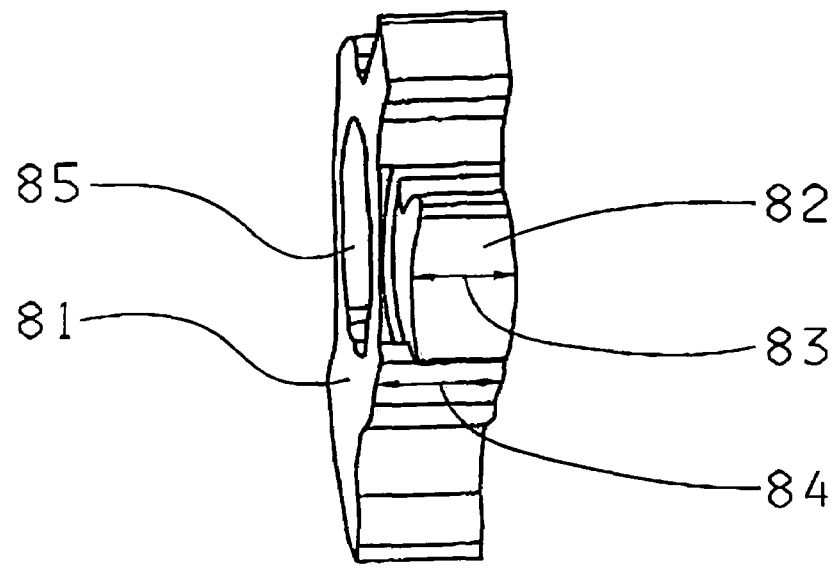
FIG. 14 shows a shift finger with reduced engagement width.

Finally, FIG. 14 shows, that for producing an easy shifting action, each or also only a few of the shift fingers 81 have a smaller component width 83 around their area of engagement 82 than around their hub or the opening 85 through which the shift finger 81 is drawn onto the shift finger shaft 1. Furthermore, the component width 83 in the engagement area 82 of the shift finger 81 should be smaller than a width 86 of the gearshift frame 68. In addition, the engagement area 82 of the shift finger 81, either by itself or in collaboration with the catch stop geometry 71, 72, 73, can be constructed in such a way that the catch stops 69, 70 in the selector path 75 make a diagonal shift possible or at least support the same.

Of course the shifting device of the invention may also be used for shifting a transmission in which loose wheels are exclusively arranged on the gearshift shafts which can, for example by means of the described coupling devices of synchronize rings and sliding collars, are connected torsion-resistantly with the shafts.

Figure 15:
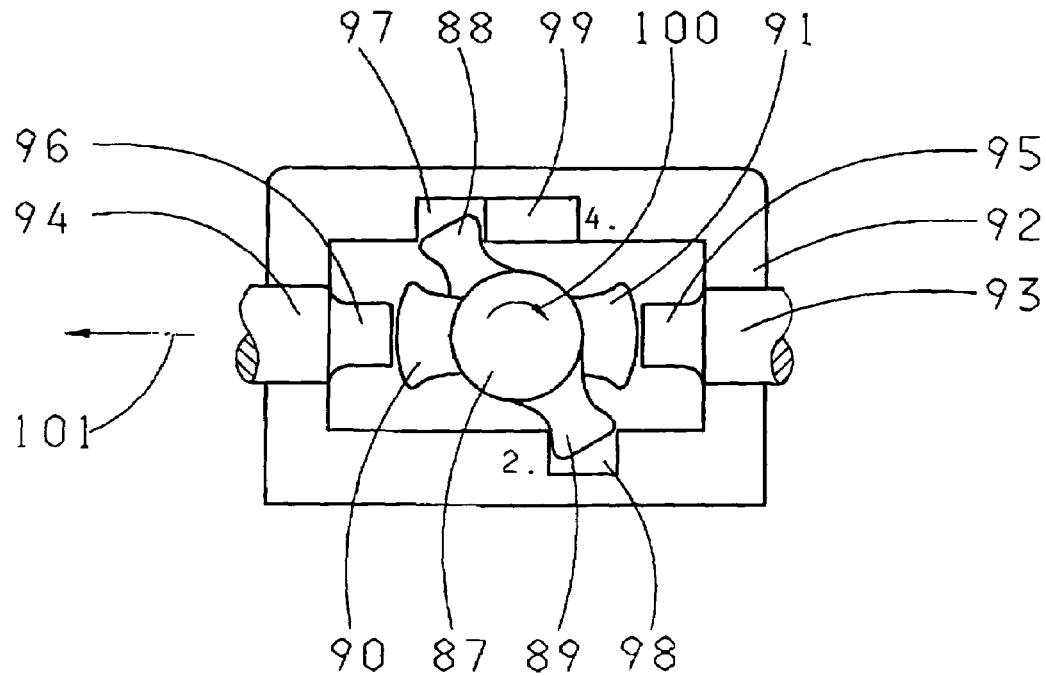
FIG. 15, 16 shows an alternative design of a gearshift frame with sliding selector shafts and shift fingers.
Figure 16:
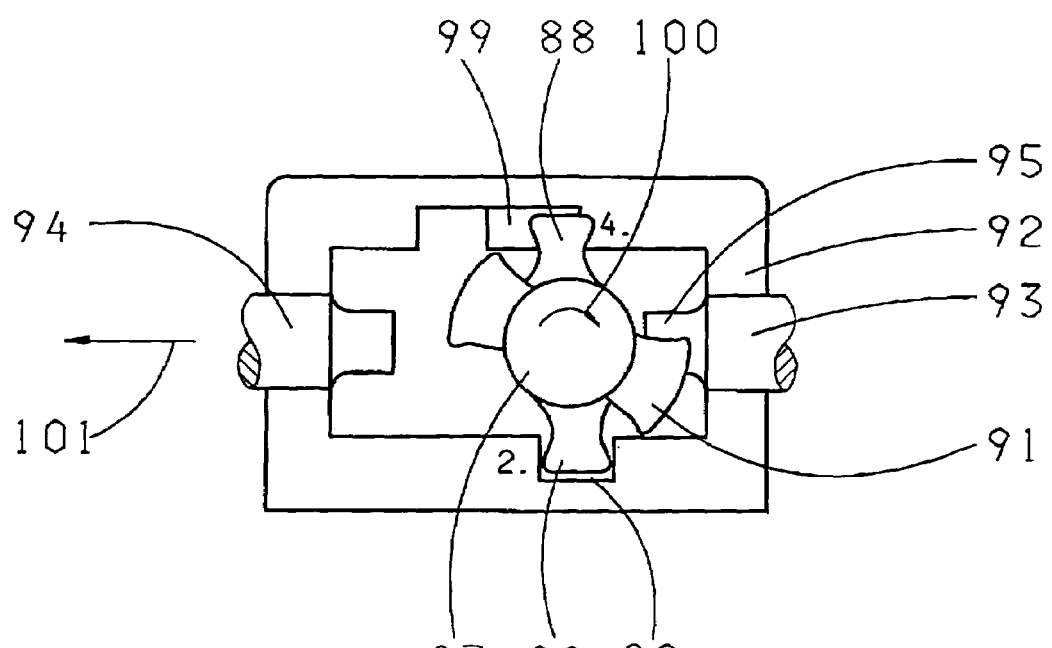

In a further variation of the invention (FIGS. 15, 16), a shift finger shaft 87, whose shift fingers 88, 89 are not arranged perpendicularly in recesses 97, 98 of a gearshift frame 92 or not perpendicularly to a sliding selector shafts 93, 94 in a neutral position of the transmission is shown. The shift fingers 88, 89 are essentially positioned diametrically to each other and axially staggered to each other on the shift finger shaft 87. Locking fingers 90, 91 are also positioned diametrically to each other, however, swiveled by an angle to the axis of the shift fingers 88, 89 on the shift finger shaft 87. These locking fingers 90, 91 act together with catch stops 95, 96, which join the sliding selector shafts 93, 94 in the interior of gearshift frame 92. The gearshift frame 92 laterally has the recess 97 with a ramp-shaped bezel 99 so that a gearshifting gate can be reproduced by gliding the shift finger 88 on the ramp 99. This gate function can alternatively be done by using ramps on the catch stops 95, 96, if these act together with the shift fingers 90, 91. In the position shown in FIG. 15, the shift fingers 88, 89 are in neutral position in the recesses 97, 98. This is necessary since the rotation, for example, when shifting from the second into the third gear, has to continue in opposite direction of a shown direction of rotation 100, so that the shift finger for the third gear (not shown here) can displace the corresponding gearshift frame, and the shift finger 89 for the second gear can swivel out of the recess 98 of the gearshift frame 92 for the second gear.

For putting the transmission into second gear, for example (FIG. 16), the shift finger shaft 87 is rotated further into the direction of rotation 100, so that the shift finger 89 swivels into the recess 98 for the second gear, and the gearshift frame 92 is shifted to the left in direction 101. In second gear, the shift finger 89 is perpendicular to the axis of the gearshift frame 92 or to the axes of the sliding selector shafts 93, 94. The corresponding shift finger 88 for the fourth gear is in one level in front of the gearshift frame 92 and can, therefore, be swivelled upward vertically. The reverse sequence is performed to take the transmission out of second gear and the shift finger shaft 87 is rotated against the shown direction of rotation 100 until the shift finger 89 swivels out of the recess 98 (see also FIG. 15).

Another development (FIGS. 17, 18) of the invention suggests to only have one shift finger 103 to actuating a gearshift package or to put the transmission in or out of two gears (for example, gear five and six) and acts together with gearshift frame 107. The gearshift frame 107 has sliding selector shafts 108 and 109. In neutral position, the shift finger 103 is in recess 112 of the gearshift frame 107 and the locking fingers 105, 106 lock catch stops 110, 111, so that the gearshift frame 107 cannot be displaced. When turning a shift finger shaft 102 in the direction of rotation 115, the shift finger 103 swivels into recess 112 to the left, so that the gearshift frame 107 is displaced in direction 116 and the fifth gear is put in. Ramps 108 and 109 aid in the insertion of the shift finger into the recess. During this swivel movement of the shift finger shaft 102, the locking finger 105 swivels into a level in front of a stop catch 110. A shift finger 104, as well as the locking finger 106, is not engaged when the fifth gear is put in.

Figure 17:
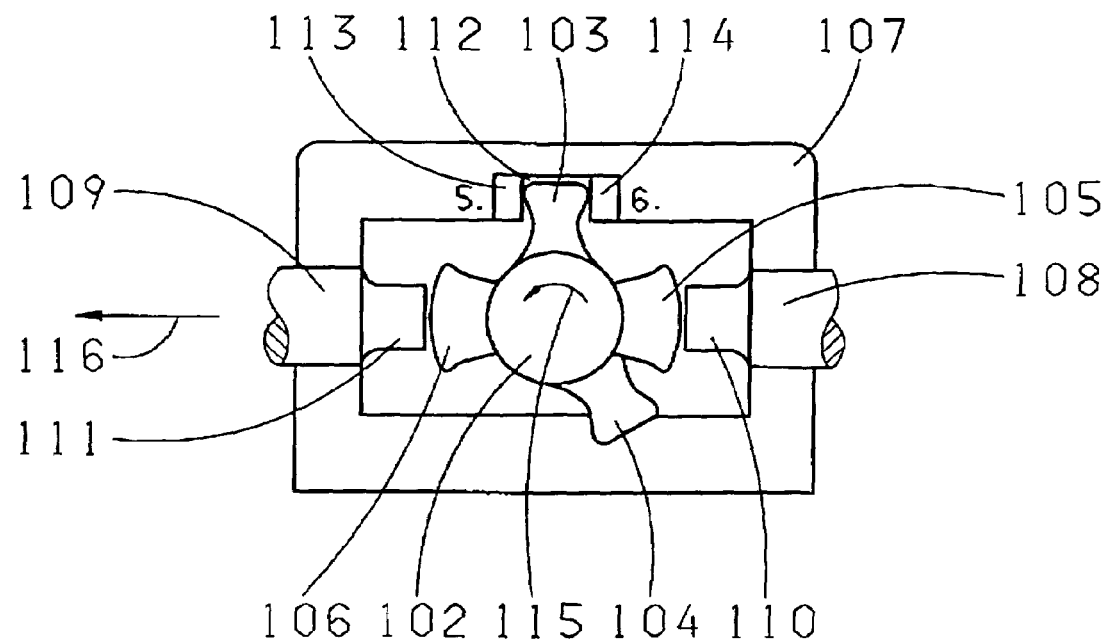
FIG. 17, 18 show an additional design of a gearshift frame with only one shift finger for two gears.
Figure 18:
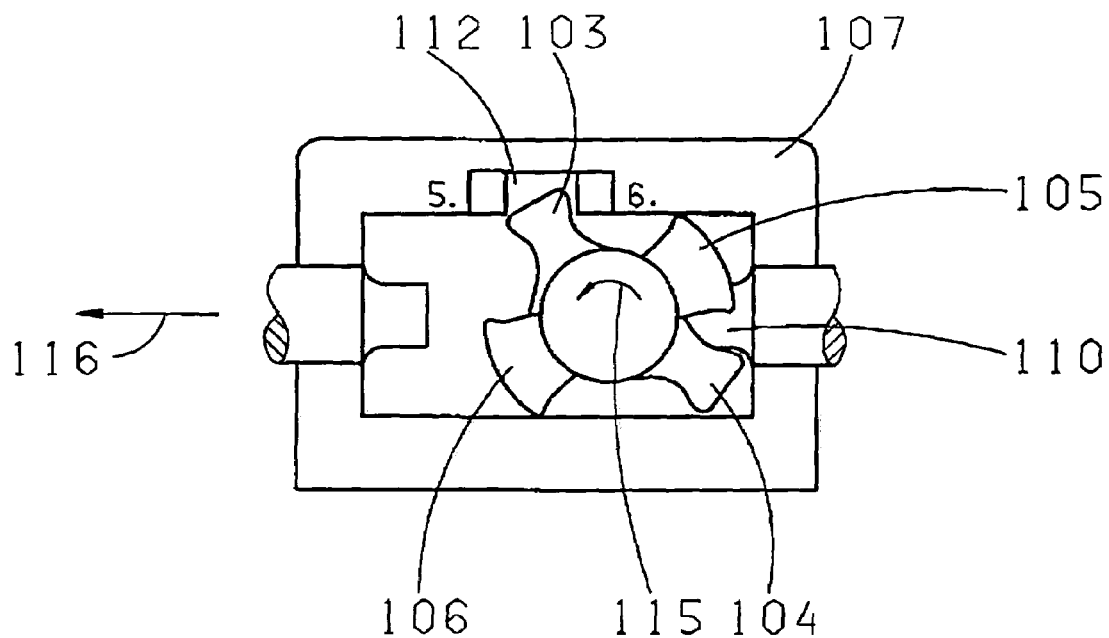

For taking the fifth gear out, the shift finger shaft 102 is rotated against the shown direction of rotation 115 to the right, so that the shift finger 103 displaces the gearshift frame 102 against the shown direction 116 to the right into neutral position (FIG. 17).

In the FIGS. 19 to 22 below, we illustrate another interesting aspect of the invention, which makes four gears shiftable by way of two shift fingers. Characteristic for such a design of the shifting device are two gearshift frames 121, 122 arranged closely together, which act together with two shift fingers 118, 129 that are positioned axially staggered to each other on a shift finger shaft 117. Such a shifting device may be used when, for example, the odd-numbered gears one, three, five (seven) are situated this way on an input shaft and the even-numbered gears two, four, six, as well as the reverse gear are situated this way on the other input shaft. In the neutral position shown in FIG. 19, the shift finger 118 is in a recess 124 for the first gear, whereas locking fingers 119, 120 are in contact with a catch stop 123 and the recess 124, making the gearshift frame 121 fixed and not displaceable. For example, to put the engine into first gear, the shift finger shaft 117 is rotated in the direction of rotation 127, so that, on the one hand, the locking fingers 119, 120 release the catch stop 123 and the recess 124 with the aid of ramp 126 and, on the other hand, the shift finger 118 displaces the gearshift frame 121 in direction 128 that the first gear is put in (FIG. 19).

Figure 19:
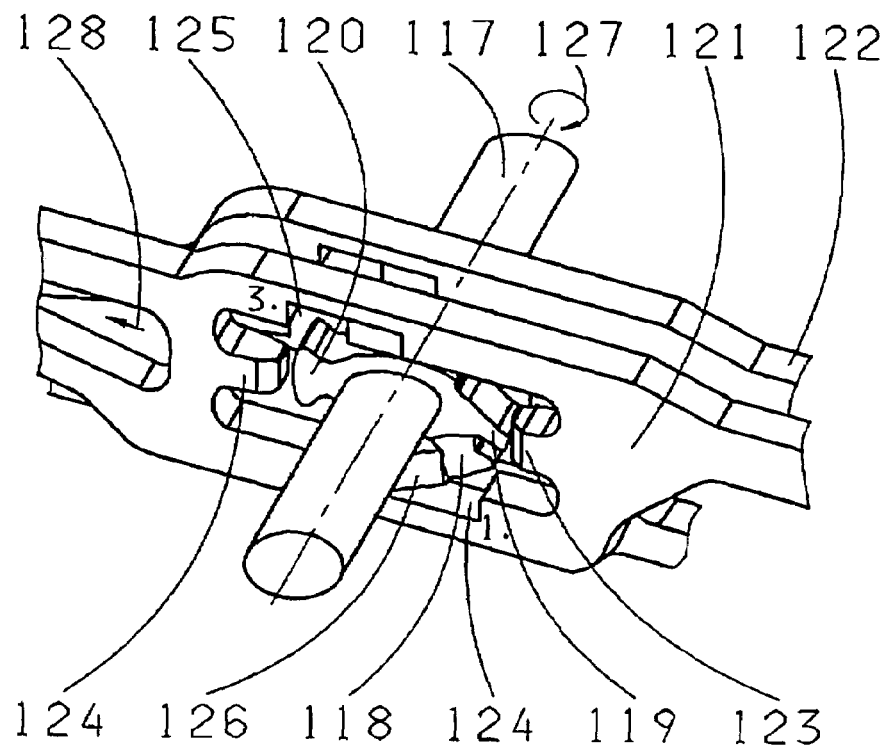
FIG. 19 to 22 show two gearshift frames arranged closely next to each other in order to shift four gears with two shift fingers from perspective viewpoint.

To take the engine out of the first gear, a rotation of the shift finger shaft 117 occurs against the shown direction of rotation 127, until the shift finger 118 is again in the position shown in FIG. 19, in which it can swivel upwards against the shown direction of rotation 127 out of the recess 124 of the gearshift frame 121.

For putting the engine into third gear (FIG. 20), the shift finger shaft 117 is moved by one shift finger width axially in direction 130. Thus, the shift finger 118 and locking fingers 119, 120 disengage from the corresponding recesses 124 and catch stop 123, 124, and thereby are on the same level in front of the gearshift frame 121. The "back" shift finger 129 can thereby insert itself into a recess 125 for the third gear. By swiveling the shift finger shaft 117 in direction 127, the shift finger 129 swivels the gearshift frame 121 in direction 130 to the right so that the third gear can be put in. To take out the third gear, the reverse happens against the demonstrated direction of rotation 127.

Figure 20:
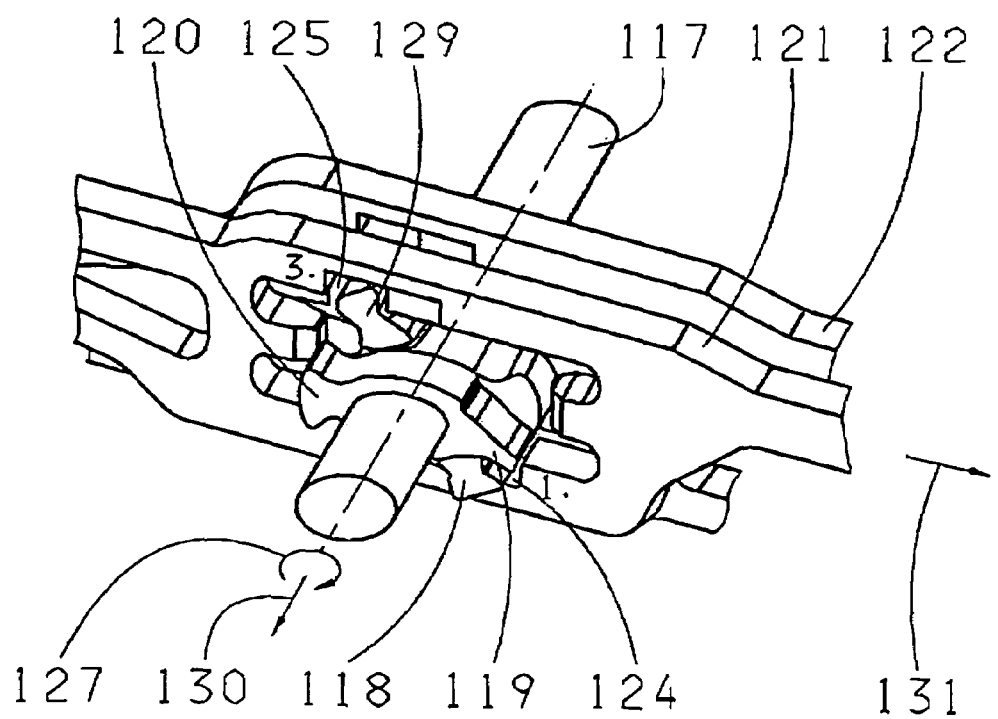
Figure 21:
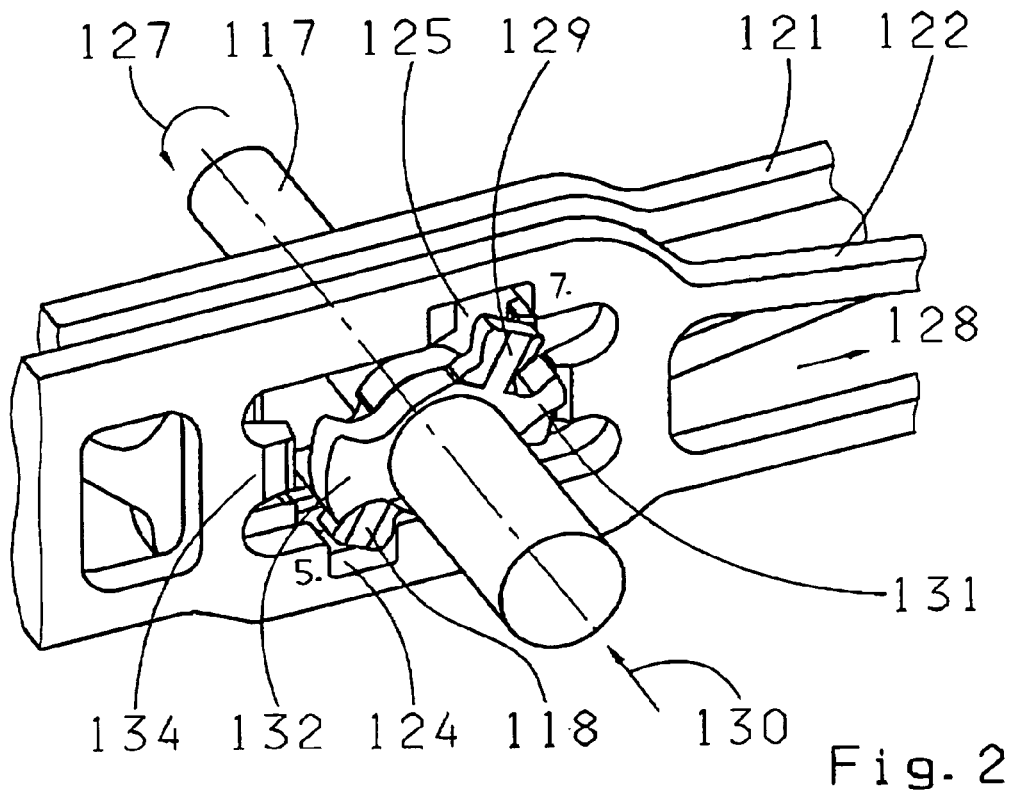
Figure 22:
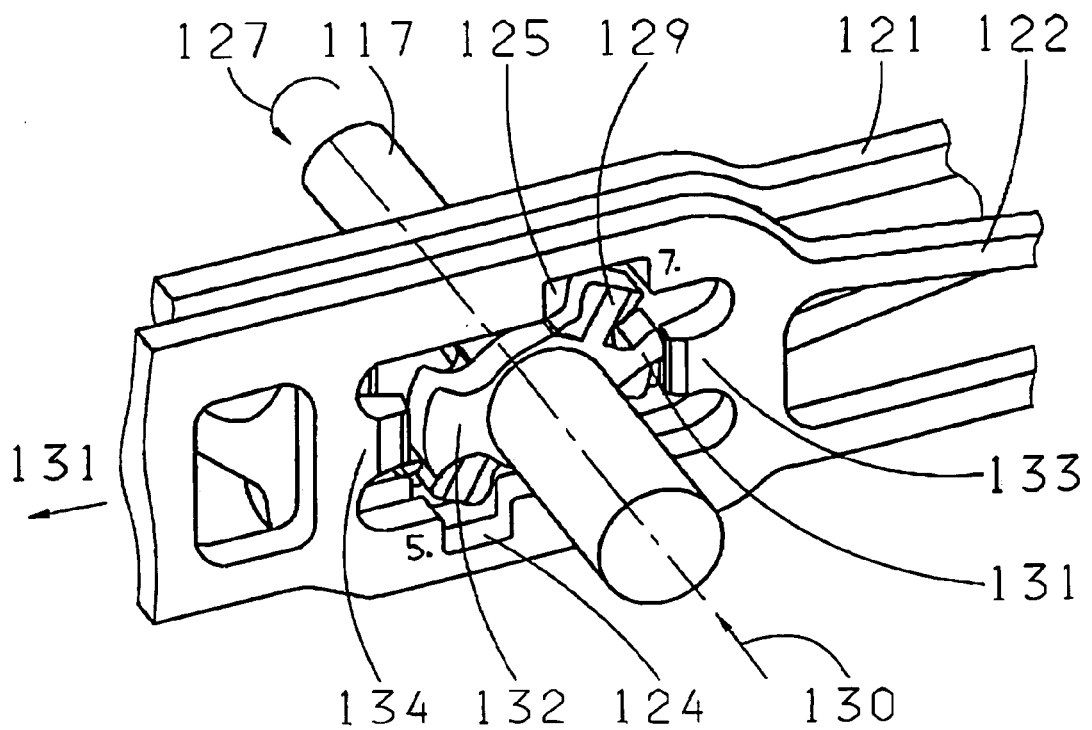

A rear view of the gearshift frame 121, 122, according to FIGS. 19 and 20, is shown in FIGS. 21 and 22, so that only the gearshift frame 122 is visible as a front gearshift frame. In gearshift frame 122, recesses 124, 125 are arranged so that they can shift the fifth or seventh gear. In order to shift the fifth gear, the now in the "back" lying shift finger 118 is in the recess 124 (FIG. 21). The shift finger 129, as well as locking fingers 131, 132 are on one level in front of the gearshift frame 122. By rotating the shift finger shaft 117 in direction 127 counterclockwise, the shift finger 118 is swivelled in such a way that it displaces the gearshift frame 122 in direction 128 to the right and the fifth gear is put in.

For shifting the seventh gear (FIG. 22), the shift finger shaft 117 is shifted by one shift finger width in direction 130 in such a way that the shift finger 129 inserts itself into the recess 125 of the gearshift frame 122. This way, the locking fingers 131, 132 are in contact with catch stops 133, 134 of the gearshift frame 122. By rotating the shift finger shaft 117 in clockwise direction 127, the gearshift frame 122 is shifted to the left in direction 130, and the seventh gear is put in. Taking out of the fifth or seventh gear takes place as described, but in reverse sequence.

| Reference numerals | |
|---|---|
| 1 | shift finger shaft |
| 2 | shift finger |
| 3 | shift finger |
| 4 | shift finger |
| 5 | shift finger |
| 6 | shift finger |
| 7 | shift finger |
| 8 | shift finger |
| 9 | recess |
| 9a | recess |
| 10 | Sliding selector shaft |
| 11 | sliding selector shaft |
| 12 | sliding selector shaft |
| 13 | sliding selector shaft |
| 14 | gearshift frame |
| 15 | gearshift frame |
| 16 | gearshift frame |
| 17 | gearshift frame |
| 18 | axial displacement |
| 19 | twisting direction |
| 20 | engine-to-body-clearance contour |
| 21 | gearshift contour |
| 22 | engine-to-body-clearance contour |
| 23 | recess |
| 24 | locking device |
| 25 | sidewall of recess |
| 26 | directional arrow |
| 27 | gearshift contour |

| -continued | |
|---|---|
| Reference numerals | |
| 28 | gearshift contour on shift finger |
| 29 | engine-to-body-clearance contour on shift finger |
| 30 | power train |
| 31 | engine |
| 32 | clutch |
| 33 | transmission |
| 34 | shifting device |
| 35 | gearshift lever |
| 36 | gearshifting gate |
| 37 | double clutch |
| 38 | input shaft; hollow shaft |
| 39 | input shaft |
| 40 | loose wheel |
| 41 | loose wheel |
| 42 | fixed wheel |
| 43 | fixed wheel |
| 44 | fixed wheel |
| 45 | lose wheel |
| 46 | fixed wheel |
| 47 | loose wheel |
| 48 | loose wheel |
| 49 | loose wheel |
| 50 | fixed wheel |
| 51 | fixed wheel |
| 52 | countershaft |
| 53 | gearshift package |
| 54 | gearshift package |
| 55 | gearshift package |
| 56 | sliding selector shaft |
| 57 | sliding selector shaft |
| 58 | sliding selector shaft |
| 59 | sliding selector shaft |
| 60 | gearshift frame |
| 61 | gearshift frame |
| 62 | shift finger |
| 63 | recess |
| 64 | recess |
| 65 | shift finger |
| 66 | recess |
| 67 | recess |
| 68 | gearshift frame |
| 69 | catch stop |
| 70 | catch stop |
| 71 | catch stop contour |
| 72 | catch stop contour |
| 73 | catch stop contour |
| 74 | course of motion |
| 75 | selector path |
| 76 | gearshift path |
| 77 | gearshift path |
| 78 | gearshift path |
| 79 | diagonal shifting diagram |
| 80 | diagonal shifting diagram |
| 81 | shift finger |
| 82 | area of engagement |
| 83 | component width |
| 84 | component width |
| 85 | opening |
| 86 | component width |
| 87 | shift finger shaft |
| 88 | shift finger |
| 89 | shift finger |
| 90 | locking finger |
| 91 | locking finger |
| 92 | gearshift frame |
| 93 | sliding selector shaft |
| 94 | sliding selector shaft |
| 95 | catch stop |
| 96 | catch stop |
| 97 | recess |
| 98 | recess |
| 99 | ramp |
| 100 | direction of rotation |
| 101 | sliding direction |
| 102 | shift finger shaft |
| 103 | shift finger |

-continued

| Reference numerals | |
|---|---|
| 104 | shift finger |
| 105 | locking finger |
| 106 | locking finger |
| 107 | gearshift frame |
| 108 | sliding selector shaft |
| 109 | sliding selector shaft |
| 110 | catch stop |
| 111 | catch stop |
| 112 | recess |
| 113 | ramp |
| 114 | ramp |
| 115 | direction of rotation |
| 116 | sliding direction |
| 117 | shift finger shaft |
| 118 | shift finger |
| 119 | locking finger |
| 120 | locking finger |
| 121 | gearshift frame |
| 122 | gearshift frame |
| 123 | catch stop |
| 124 | recess |
| 125 | recess |
| 126 | ramp |
| 127 | direction of rotation |
| 128 | sliding direction |
| 129 | shift finger |
| 130 | sliding direction |
| 131 | locking finger |
| 132 | locking finger |
| 133 | catch stop |
| 134 | catch stop |
| G1 | first gear |
| G2 | Second gear |
| G3 | third gear |
| G4 | fourth gear |
| G5 | fifth gear |
| G6 | sixth gear |
| G7 | seventh gear |
| RG | reverse gear |

The invention claimed is:

1. A shifting device for a multi-step transmission, in which at least one gearshift package (53, 54, 55) is allocated to two non-successive gear transmission ratio steps, in which each of the gearshift packages (53, 54, 55) is coupled through and actuated by at least one of sliding selector shafts and gearshift cables with a first gearshift lever (35), a shifting pattern is allocated to the first gearshift lever (35), in which two successive gear transmission ratio steps are positioned essentially opposite each other in a gearshift path, the gear transmission ratio steps selectable within the gearshift path are allocated to different gearshift packages, and the first gearshift lever (35) and the gearshift packages (53, 54, 55) are connected with a conversion device, by means of which an other gearshift lever movement in a first gearshift path results in taking out of a preceding gear (G1, G3, G5, G7) of a first gearshift package (53, 54, 55), a second gearshift lever movement in the first gearshift path results in insertion of a new gear (G2, G4, G6, RG) of a second gearshift package (53, 54, 55), the first gearshift lever (35) is coupled with an axially displaceable shift finger shaft (1) which can be swivelled around a longitudinal axis, the shift finger shaft (1) respectively penetrates an opening of gearshift frames (14, 15, 16, 17) connected with sliding selector shafts (10, 11, 12, 13, 14, 56, 57, 58, 59), at the shift finger shaft (1) at least one shift finger (2, 3, 4, 5, 6, 7, 8) per gear transmission ratio step, or per gearshift frame (14, 15, 16, 17) is arranged, and each of the gearshift frames (14, 15, 16, 17) has at least one recess (9, 9a) in an area of an opening, to which the at least one shift finger (2, 3, 4, 5, 6, 7, 8) is arranged.

2. The shifting device according to claim 1, wherein in an axial displacement of the shift finger shaft (1) for selecting the gearshift path, at least one shift finger (2, 3, 4, 5, 6, 7, 8) engages into one recess (9, 9a) of a gearshift frame (14, 15, 16, 17), and in a radial swiveling (19) of the shift finger shaft (1) around the longitudinal axis for one of putting in and taking out of a gear (GR, G1, G2, G3, G4, G5, G6, G7), the at least one shift finger (2, 3, 4, 5, 6, 7, 8) axially shifts the gearshift frame (14, 15, 16, 17).

3. The shifting device according to claim 1, wherein one of the sliding selector shafts (10, 11, 12, 13, 14, 56, 57, 58, 59) and the gearshift frame (14, 15, 16, 17) for actuating of a gearshift medium of the gearshift packages (53, 54, 55) are connected with one of gearshift forks and gearshift rockers, which engage in sliding collars arranged axially displaceable and torsion-resistantly on gearshift shafts.

4. The shifting device, according to claim 1, wherein the gearshift frames (14, 15, 16, 17) with the sliding select or shafts (10, 11, 12, 13, 14, 56, 57, 58, 59) are in the conversion device for actuating a reverse gear (RG), and if needed, a seventh gear (G7), a first and third gear (G1, G3), a fourth and fifth gear (G4, G5), as well as a second and sixth gear (G2, G6), and are situated axially behind each other with respect to the shift finger shaft (1).

5. The shifting device according to claim 1, wherein the recesses (9, 9a) are located in the gearshift frames (14, 15, 16, 17), and have a gearshift contour (22, 27) in a shifting direction with an essentially radially aligned stop face, and in an opposite direction an essentially curved engine-to-body-clearance contour (20, 21).

6. The shifting device according to claim 1, wherein the shift fingers (2, 3, 4, 5, 6, 7, 8) are built such that the shift fingers have a gearshift contour (28) in a shifting direction with an essentially radially aligned stop face, and in an opposite direction an essentially curved, or at least beveled engine-to-body-clearance contour (29).

7. The shifting device according to claim 1, wherein the shifting pattern is assigned to the first gearshift lever (35), and is in the form of an "H", or a multiple "H".

8. The shifting device according to claim 1, wherein the at least one shift finger (2, 3, 4, 5, 6, 7, 8) of the shift finger shaft (1) is taken out of an engaging position in the opening of the gearshift frame (14, 15, 16, 17) in an axial displacement (arrow 18), while the at least one other shift finger (2, 3, 4, 5, 6, 7, 8) inserts itself into an opening of another gearshift frame (14, 15, 16, 17).

9. The shifting device according to claim 1, wherein a contour of the recess (9, 9a) of the gearshift frame (14, 15, 16, 17) is designed such that the contour of the recess controls power transmission ratio of the shifting device.

10. The shifting device according to claim 1, wherein each of the at least one shift fingers (2, 3, 4, 5, 6, 7, 8) have different lengths for setting respective gear-specific synchronous paths.

11. The shifting device according to claim 1 wherein an axial distance between two gearshift frames (60, 61) is one of at least one shift finger width (84) and three shift finger widths (84).

12. The shifting device according to claim 1, wherein a contour of an engagement area (82) of the shift finger (81) is created such that the contour of the engagement area allows or generates a movability (74) of the first gearshift lever (35) in gearshifting gate (36) in a change of the gearshift path, in which the first gearshift lever (35) can be moved mainly diagonally in a selector path (75).

13. The shifting device according to claim 1, wherein a width (83) of an engagement area (82) of the shift finger (81) is smaller than a width (84) of the shift finger (81) in an area of a hub, or opening (85).

14. The shifting device according to claim 1, wherein one or more of the opening and the outer geometry of the gearshift frame (14, 15, 16, 17) are essentially oval, circular, or rectangular.

15. The shifting device according to claim 14, wherein the sliding selector shafts (10, 11, 12, 13, 14, 56, 57, 58, 59) and the gearshift frame (14, 15, 16, 17) are built as a common component, preferably as a metal cutting die.

16. The shifting device according to claim 1, wherein two shift fingers are allocated to each gearshift frame (14, 15, 16, 17) on the shift finger shaft (1).

17. The shifting device, according to claim 16, wherein the two shift fingers (2, 3, 4, 5, 6, 7, 8), allocated to each of the gearshift frames (14, 15, 16, 17), are positioned at one of a same location on the shift finger shaft (1) and axially behind each other such that the shift finger (2, 3, 4, 5, 6, 7, 8) points radially into one of a same, or in opposite direction.

18. The shifting device according to claim 1, wherein there are recesses (23) at one or more of the shift fingers (2, 3, 4, 5, 6, 7, 8), and at the sites of the shift finger shaft (1) that correspond with the shift fingers, into which a locking medium (24) engages which releases a shifting action for a gear, while other gears are locked.

19. The shifting device according to claim 18, wherein the locking medium (24) is a cam that is positioned at the gearshift frame (14, 15, 16, 17), and points to the shift finger path (1).

20. The shifting device according to claim 18, wherein the recesses (23) at one or more of the shift fingers (2, 3, 4, 5, 6, 7, 8), and the shift finger shaft (1) have angular side walls.

21. The shifting device according to claim 18, wherein the recesses essentially are provided as hubs in circumferential direction on the shift finger shaft, wherein the hubs extend at least over a section of the circumference.

22. The shifting device according to claim 1, wherein the shifting device can be actuated manually, or through a power-assisted regulating device.

23. The shifting device according to claim 22, wherein the shifting device is designed as a piston-cylinder-set-up.

24. The shifting device according to claim 1, wherein a contour (71, 72, 73) of the gearshift frame (68) is designed such that the gearshift frame allows or generates a movability (74) of the first gearshift lever (35) in a gearshifting gate (36) in a change of the gearshift path, in which the first gearshift lever (35) can be moved mainly diagonally in a selector path (75).

25. The shifting device according to claim 24, wherein a course of motion (74) of a gearshift lever (35) can be preset by the geometry of at least one of the gearshift frames and catch stops, so that function of a gate for a manual gearshift lever can be represented by one or more of gearshift frames and catch stops.

26. The shifting device according to claim 25, wherein the gearshift lever (35) when changing the gear in the gearshift path to an adjacent gear in another gearshift path, performs an essentially diagonal path in the selector path (75, 79, 80).

27. The shifting device according to claim 1, wherein the at least one shift fingers (2 to 8, 62, 65, 81) are arranged on the shift finger shaft (1) such that the shift fingers (2 to 8, 62, 65, 81) do not run perpendicular to the sliding selector shafts (10 to 13, 56 to 59), or gearshift frames (14 to 17, 60, 61, 68) in a neutral position.

28. The shifting device according to claim 27, wherein for putting the transmission in a gear by moving the first gearshift lever (35), a respective shift finger (2 to 8, 62, 65, 81) can be swivelled into a position, which is essentially arranged perpendicular to the sliding selector shaft (10 to 13, 56 to 59), or to the gearshift frame (14 to 17, 60, 61, 68).

29. The shifting device according to claim 1, wherein the shift finger is provided for actuating the gearshift package, or for putting in or taking out of two gears, and acts together with the gearshift frame (e.g., gear five/six).

30. The shifting device according to claim 29, wherein the shift finger acts together with the recess (9) of the gearshift frame for actuating the gearshift package.

31. The shifting device according to claim 29, wherein the shift finger is arranged on the shift finger shaft (1) for actuating the gearshift frame such that in neutral position, the shift finger essentially runs perpendicular to the sliding selector shaft, or to the gearshift frame.

32. The shifting device according to claim 29, wherein for putting the transmission in a gear by using the gearshift lever, the shift finger can be swivelled into a position, which is essentially not perpendicularly located to the sliding selector shaft, or to the gearshift frame.

33. The shifting device according to claim 29, wherein four gears can be shifted with two shift fingers.

34. A motor vehicle transmission comprising a shifting device, wherein the shifting device includes at least one gearshift package (53, 54, 55) is allocated to two non-successive gear transmission ratio steps, in which each of the gearshift packages (53, 54, 55) is coupled through and actuated by at least one of sliding selector shafts and gearshift cables with a first gearshift lever (35), a shifting pattern is allocated to the first gearshift lever (35), in which two successive gear transmission ratio steps are positioned essentially opposite each other in a gearshift path, the gear transmission ratio steps selectable within the gearshift path are allocated to different gearshift packages, and the first gearshift lever (35) and the gearshift packages (53, 54, 55) are connected with a conversion device, by means of which an other gearshift lever movement in a first gearshift path results in taking out of a preceding gear (G1, G3, G5, G7) of a first gearshift package (53, 54, 55), a second gearshift lever movement in the first gearshift path results in insertion of a new gear (G2, G4, G6, RG) of a second gearshift package (53, 54, 55), the first gearshift lever (35) is coupled with an axially displaceable shift finger shaft (1) which can be swivelled around a longitudinal axis, the shift finger shaft (1) respectively penetrates an opening of gearshift frames (14, 15, 16, 17) connected with sliding selector shafts (10, 11, 12, 13, 14, 56, 57, 58, 59), at the shift finger shaft (1) at least one shift finger (2, 3, 4, 5, 6, 7, 8) per gear transmission ratio step, or per gearshift frame (14, 15, 16, 17) is arranged, and each of the gearshift frames (14, 15, 16, 17) has at least one recess (9, 9a) in an area of an opening, to which the at least one shift finger (2, 3, 4, 5, 6, 7, 8) is arranged.

35. The motor vehicle transmission according to claim 34, wherein the transmission exclusively contains loose wheels, whose respectively gearshift packages for the torsion-resistant connection are allocated to one gearshift shaft each.

36. The motor vehicle transmission according to claim 34, wherein the transmission is constructed as a double clutch transmission.

37. The motor vehicle transmission according to claim 34, wherein the transmission contains a double clutch gearset with only one start clutch (32).

* * * * *